US007855706B2

(12) United States Patent
Ozawa

(10) Patent No.: US 7,855,706 B2
(45) Date of Patent: Dec. 21, 2010

(54) METHOD OF DRIVING ELECTRO-OPTICAL ELEMENT, PIXEL CIRCUIT, ELECTRO-OPTICAL DEVICE AND ELECTRONIC APPARATUS

(75) Inventor: Tokuro Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 819 days.

(21) Appl. No.: 11/781,538

(22) Filed: Jul. 23, 2007

(65) Prior Publication Data

US 2008/0079679 A1 Apr. 3, 2008

(30) Foreign Application Priority Data

Aug. 7, 2006 (JP) ............................. 2006-214189
Jun. 8, 2007 (JP) ............................. 2007-152425

(51) Int. Cl.
*G09G 3/36* (2006.01)

(52) U.S. Cl. ........................................ 345/89; 345/690

(58) Field of Classification Search .................. 345/87, 345/89, 204, 206, 214, 690; 349/48, 143; 372/12

See application file for complete search history.

(56) References Cited

U.S. PATENT DOCUMENTS 6,337,542 B1 * 1/2002 Hanaki et al. ............ 315/169.3

FOREIGN PATENT DOCUMENTS

JP A 2003-149654 5/2003

* cited by examiner

*Primary Examiner*—Abbas I Abdulselam
(74) *Attorney, Agent, or Firm*—Oliff & Berridge PLC

(57) ABSTRACT

Provided is a method of driving an electro-optical element having a first electrode, a second electrode, and an electro-optical material provided between the first electrode and the second electrode and having optical characteristics which vary in accordance with an applied voltage, including: applying a fixed voltage to the first electrode and applying a data voltage according to a gray scale level to be displayed to the second electrode in a first period; applying the data voltage to the first electrode and applying the fixed voltage to the second electrode in a second period; and alternately repeating the driving in the first period and the driving in the second period.

9 Claims, 17 Drawing Sheets

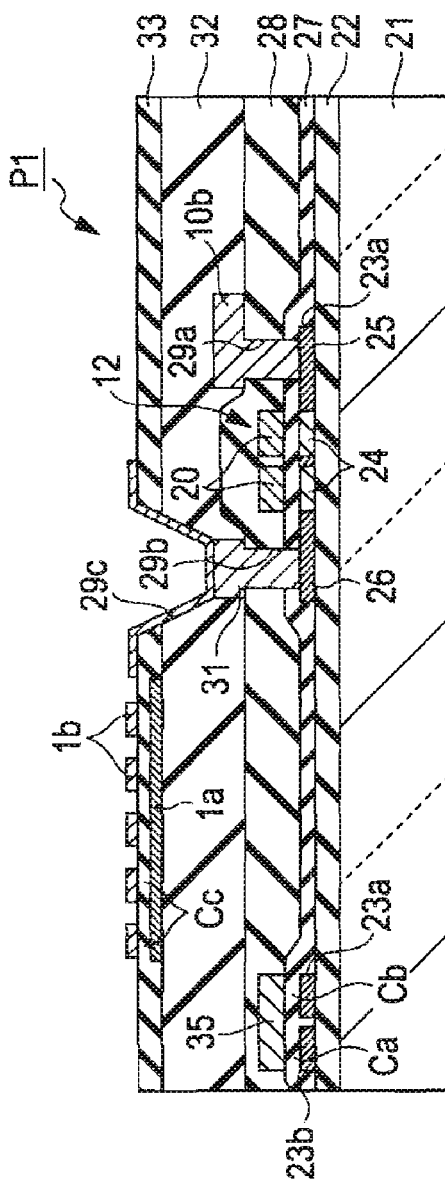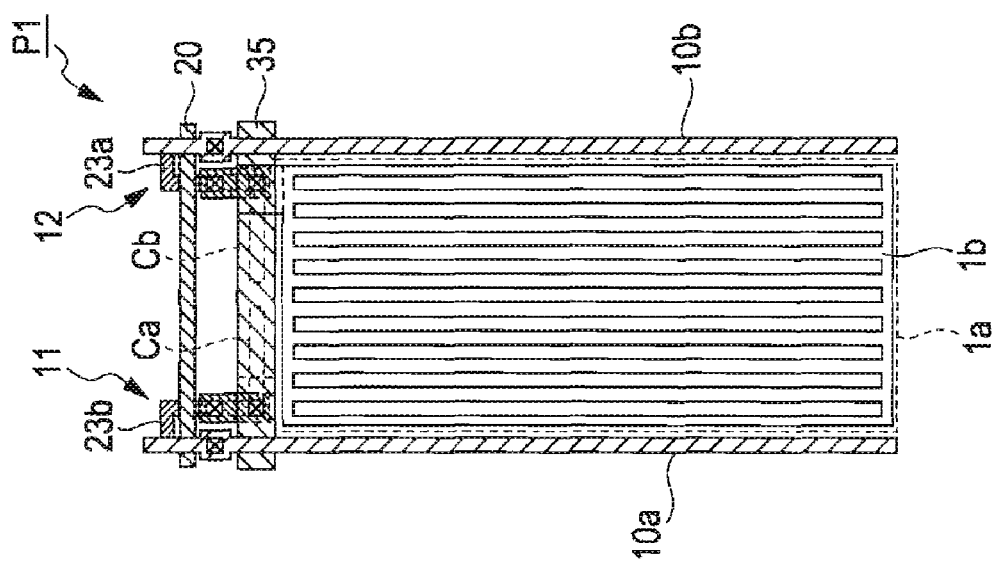

METHOD OF DRIVING ELECTRO-OPTICAL ELEMENT, PIXEL CIRCUIT, ELECTRO-OPTICAL DEVICE AND ELECTRONIC APPARATUS

The entire disclosure of Japanese Patent Application Nos: 2006-214189, filed Aug. 7, 2006 and 2007-152425, filed Jun. 8, 2007 are expressly incorporated by reference herein.

BACKGROUND

1. Technical Field

The present invention relates to a technology for driving an electro-optical element such as a liquid crystal element.

2. Related Art

In a liquid crystal device, a driving method in which a vertical electric field is applied in a light emission direction to liquid crystal and a driving method in which a horizontal electric field is applied in a direction perpendicular to the light emission direction to liquid crystal are known. When a DC voltage is applied to liquid crystal, image quality deterioration such as burn-in may be caused. As a driving method, an AC driving method in which an AC voltage is applied to liquid crystal is used.

In a driving method in which a vertical electric field is applied to liquid crystal, for example, a pixel circuit shown in FIG. 22 is used. In this pixel circuit, when a scan signal Y becomes of a high level, a transistor Tr is turned on, and a data voltage Vdata supplied via a data line 10 is applied to a liquid crystal element 5 and is held in a hold capacitor C. The liquid crystal element 5 is configured by inserting liquid crystal LC between a pixel electrode 5a and a common electrode 5b. The transistor Tr and the pixel electrode 5a are formed on a device substrate, and the common electrode 5b is formed on a counter substrate. The device substrate and the counter substrate are adhered to each other with a gap therebetween and liquid crystal is injected therebetween. The common electrode 5b formed on the counter substrate also functions as a plurality of pixel circuits and is applied with a common voltage VCOM. In such a circuit configuration, a period when the data voltage Vdata is higher than the common voltage VCOM and a period when the data voltage Vdata is lower than the common voltage VCOM are alternately repeated so as to apply an AC voltage to the liquid crystal LC.

In a pixel circuit using the horizontal electric field driving method, a first electrode and a second electrode are formed on the device substrate on which switching transistors are formed. A technology for respectively applying signals, which are image signals having a positive polarity and a negative polarity with respect to a fixed voltage and have an identical absolute value, to the first electrode and the second electrode is known (for example, JP-A-2003-149654 (paragraph number 0033)).

However, in the pixel circuit shown in FIG. 22, a timing when the scan signal Y is switched from a high level to a low level, a push-down phenomenon in which the voltage applied to the liquid crystal LC is reduced occurs. The push-down phenomenon occurs because charges written into the liquid crystal element 5 escape from a scan line 20 via a coupling capacitance between the scan line 20 and the liquid crystal LC in a moment when the scan signal Y applied to the scan line 20 is changed from a voltage level for turning on the transistor Tr to a voltage level for turning off the transistor Tr. The coupling capacitance mainly includes a capacitance component Cgd between a gate electrode of the transistor Tr and the liquid crystal LC and a capacitance component Cgd' between the scan line 20 and the pixel electrode 5a. Between them, the capacitance component Cgd varies in accordance with a voltage Vgd applied between the gate electrode and a drain electrode and the capacitance component Cgd increases as the voltage Vgd applied between the gate electrode and the drain electrode increases. As the coupling capacitance increases, the voltage applied to the liquid crystal LC decreases.

A drop in voltage due to the push-down phenomenon will be described in detail with reference to FIG. 23. For example, in the pixel circuit shown in FIG. 22, the data voltage Vdata having the positive polarity with respect to the common voltage VCOM is applied to the first electrode in a first frame period F1, and the data voltage Vdata having the negative polarity with respect to the common voltage VCOM is applied to the first electrode in a second frame period F2. In this case, the voltage applied to the liquid crystal LC decreases in accordance with the voltage Vgd between the gate and drain electrodes of the transistor Tr. In this example, the liquid crystal LC is arranged in a normally white mode and $\Delta V1 < \Delta V2 < \Delta V3 < \Delta V4$ is realized. For example, when a black level is displayed, the voltage applied to the liquid crystal LC decreases by $\Delta V1$ in the first frame period F1 and the voltage applied to the liquid crystal LC increases by $\Delta V4$ in the second frame period F2. That is, the voltage applied to the liquid crystal LC is shifted to a white side in the first frame period F1 and the voltage applied to the liquid crystal LC is shifted to a black side in the second frame period F2.

Accordingly, when the pixel circuit shown in FIG. 22 is employed, in order to correct the shift of the voltage applied, to the liquid crystal LC, a DC voltage needs to be prevented from being applied to the liquid crystal LC by controlling the common voltage VCOM. Gamma correction process needs to be switched according to the polarity of the applied voltage. Even in the pixel circuit using the horizontal electric field driving method, since the signals which are image signals having a positive polarity and a negative polarity with respect to a fixed voltage and have an identical absolute value are respectively applied to the first electrode and the second electrode, the same problem is caused.

SUMMARY

An advantage of some aspects of the invention is that the following aspects or embodiments are realized.

According to an aspect of the invention, there is provided a method of driving an electro-optical element having a first electrode, a second electrode, and an electro-optical material provided between the first electrode and the second electrode and having optical characteristics which vary in accordance with an applied voltage, including: applying a fixed voltage (for example, a ground voltage GND) to the first electrode and applying a data voltage according to a gray scale level to be displayed to the second electrode in a first period (for example, a first frame period F1 of an embodiment); applying the data voltage to the first electrode and applying the fixed voltage to the second electrode in a second period (for example, a second frame period F2 of the embodiment); and alternately repeating the driving in the first period and the driving in the second period.

By this method, since the fixed voltage is supplied to one electrode of the electro-optical element and the data voltage is supplied to the other electrode in the first period and the fixed voltage is supplied to the other electrode of the electro-optical element and the data voltage is supplied to one electrode in the second period, the electro-optical element can be AC-driven. In this driving method, since the data voltage is set to one of a high voltage and a low voltage on the basis of the fixed voltage, it is not necessary to supply the electro-optical element with the data voltage having a polarity inverted on the basis of a predetermined voltage. When the data voltage having the inverted polarity is supplied, the applied voltage of the electro-optical element varies in accordance with the polarity of the data voltage due to a push-down phenomenon and thus a DC component is applied to the electro-optical element. In contrast, in this driving method, since the fixed voltage is supplied to any one electrode of the electro-optical element, the DC component is not applied to the electro-optical element although the applied voltage is reduced by the push-down phenomenon, In the method of driving the electro-optical element, gamma correction for correcting an input image signal indicating the gray scale level to be displayed according to the optical characteristics of the electro-optical material to be suitable for human visual characteristics to generate the data voltage may be performed, and the data voltage of the first period and the data voltage of the second period may be generated by an identical process in the gamma correction. In the known driving method, since the applied voltage of the electro-optical element varies in accordance with the polarity of the data voltage due to the push-down phenomenon, it is necessary to set the gamma correction according to the polarity of the data voltage. In contrast, in this driving method, since the fixed voltage is supplied to any one electrode of the electro-optical element, it is not necessary to switch the gamma correction although the applied voltage is reduced by the push-down phenomenon. Accordingly, a process can be simplified.

According to another aspect of the invention, there is provided a pixel circuit (for example, a pixel circuit P1 of a first embodiment) including: an electro-optical element including a first electrode, a second electrode, and an electro-optical material provided between the first electrode and the second electrode and having optical characteristics which vary in accordance with an applied voltage; a first switching element (for example, a transistor 11) which is provided between the first electrode and a first data line, to which a fixed voltage is supplied in a first period and a data voltage according to a gray scale level to be displayed is supplied in a second period, and is controlled to be turned on/off; and a second switching element (for example, a transistor 12) which is provided between the second electrode and a second data line, to which the data voltage is supplied in the first period and the fixed voltage is supplied in the second period, and is controlled to be turned on when the first switching element is turned on and to be turned off when the first switching element is turned off. According to this configuration, the fixed voltage can be supplied to one electrode of the electro-optical element and the data voltage can be supplied to the other electrode in the first period, and the fixed voltage can be supplied to the other electrode of the electro-optical element and the data voltage can be supplied to one electrode in the second period. Accordingly, although the applied voltage of the electro-optical element is reduced by the push-down phenomenon, the electro-optical element can be AC-driven without applying the DC component to the electro-optical element. In addition, it is not necessary to switch the gamma correction according to the polarity of the applied voltage of the electro-optical element.

In the pixel circuit, the first switching element and the second switching element may be configured by identical conductive type transistors and may be controlled to be turned on/off by an identical control signal. According to this configuration, since the identical conductive transistor is used, it is possible to simplify the process of manufacturing the pixel circuit.

According to another aspect of the invention, there is provided a pixel circuit (for example, a pixel circuit P2 of a second embodiment) including: an electro-optical element including a first electrode, a second electrode, and an electro-optical material provided between the first electrode and the second electrode and having optical characteristics which vary in accordance with an applied voltage; a first switching element which is provided between the first electrode and a first data line, to which a data voltage according to a gray scale level to be displayed is supplied, is turned on in a first period, and is turned off in a second period; a second switching element which is provided between the second electrode and a second data line, to which the data voltage is supplied, is turned off in the first period, and is turned on in the second period; a third switching element which is provided between the first electrode and a voltage line, to which a fixed voltage is supplied, is turned off in the first period, and is turned on in the second period; and a fourth switching element which is provided between the second electrode and the voltage line, is turned on in the first, period, and is turned off in the second period. According to this configuration, the fixed voltage can be supplied to one electrode of the electro-optical element and the data voltage can be supplied to the other electrode in the first period, and the fixed voltage can be supplied to the other electrode of the electro-optical element and the data voltage can be supplied to one electrode in the second period. Accordingly, although the applied voltage of the electro-optical element is reduced by the push-down phenomenon, the electro-optical element can be AC-driven without applying the DC component to the electro-optical element. In addition, it is not necessary to switch the gamma correction according to the polarity of the applied voltage of the electro-optical element.

In the pixel circuit, the first switching element, the second switching element, the third switching element, and the fourth switching element may be configured by identical conductive type transistors. Accordingly, it is possible to simplify the process of manufacturing the pixel circuit.

According to another aspect of the invention, there is provided an electro-optical device (for example, the first embodiment) including: a plurality of scan lines; a plurality of data lines, each of which includes a set of a first data line (for example, 10a shown in FIG. 1) and a second data line (for example, 10b shown in FIG. 1); a plurality of pixel circuits provided in correspondence with intersections of the plurality of scan lines and the plurality of data lines; and a data line drive unit which supplies a data voltage according to a gray scale level to be displayed to one of the set of the first data line and the second data line and supplies a fixed voltage to the other thereof, and replaces the data voltage with the fixed voltage and supplies the voltages to the first data line and the second data line in a second period, in each of the plurality of data lines, wherein each of the plurality of pixel circuits includes: an electro-optical element including a first electrode, a second electrode, and an electro-optical material provided between the first electrode and the second electrode and having optical characteristics which vary in accordance with an applied voltage; a first switching element which is provided between the first electrode and the first data line, is turned on in the first period, and is turned off in the second period according to a scan signal supplied through each of the scan lines; and a second switching element which is provided between the second electrode and the second data line, is turned on in the first period, and is turned off in the second period according to a scan signal supplied through each of the scan lines.

According to this configuration, since the first switching element and the second switching element in the pixel circuit are controlled by the identical scan signal, it is not necessary to prepare plural types of scan lines. The data voltage and the fixed voltage supplied to the first data line and the second data line are replaced with each other and supplied in the first period, and the second period. In this case, since the applied voltage of the electro-optical element is determined on the basis of the fixed voltage, an ideal AC driving can be realized without overlapping a DC component. In addition, it is not necessary to switch the gamma correction according to the polarity of the applied voltage of the electro-optical element.

According to another aspect of the invention, there is provided an electro-optical device (for example, the second embodiment) including: m (m is an integer of 2 or more) sets of scan lines, one set of scan lines including a first scan line and a second scan line, a first scan signal (for example, Yia of FIG. 10) being supplied to the first scan line, and a second scan signal (for example, Yib of FIG. 10) being supplied to the second scan line; n+1 (n is an integer of 2 or more) data lines; m×n pixel circuits provided in correspondence with intersections of the scan lines and the data lines; a data line drive unit which supplies a data voltage according to a gray scale level to be displayed to odd-numbered data lines and supplies a fixed voltage to even-numbered data lines in a first period, and supplied the fixed voltage to the odd-numbered data lines and supplies the fixed voltage to the even-numbered data lines in a second period; and a scan line drive unit which sequentially selects the m sets of scan lines and allows one of the first scan signal and the second scan signal to be valid and the other thereof to be invalid when one set of scan lines is selected, in the first period, and sequentially selects m sets of scan lines and allows the signal, which is valid in the first period, of the first scan signal and the second scan signal to be invalid and the signal, which is invalid in the first period, to be valid when one set of scan lines is selected, in the second period, wherein each of the m×n pixel circuits includes: a first switching element (for example, 15 of FIG. 10) which is provided between the first electrode and a left data line and is controlled to be turned on/off according to the first scan line; a second switching element (for example, 16 of FIG. 10) which is provided between the first electrode and a right data line and is controlled to be turned on/off according to the second scan line; a third switching element (for example, 17 of FIG. 10) which is provided between the first electrode and a voltage line to which a fixed voltage is supplied, and is controlled to be turned on/off according to the second scan line; and a fourth switching element (for example, 18 of FIG. 10) which is provided between the second electrode and the voltage line and is controlled to be turned on/off according to the second scan line.

By this configuration, since the data lines are shared by the pixel circuits adjacent in a column direction, the number of data lines can be reduced. Since the applied voltage of the electro-optical element is determined on the basis of the fixed voltage, an ideal AC driving can be realized without overlapping a DC component. In addition, it is not necessary to switch the gamma correction according to the polarity of the applied voltage of the electro-optical element.

According to another aspect of the invention, there is provided an electronic apparatus including the above-described electro-optical device. The electronic apparatus includes, for example, a personal computer, a mobile telephone, and a personal digital assistant (PDA).

BRIEF DESCRIPTION OF THE DRAWINGS

The invention will be described with reference to the accompanying drawings, wherein like numbers reference like elements.

FIG. 3 is a schematic view showing the structure of a liquid crystal device as an example of the device, wherein FIG. 3A is a schematic plan view thereof and FIG. 3B is a schematic cross-sectional view thereof.

FIG. 21 is a schematic view showing a modified example of a liquid crystal device, wherein

DESCRIPTION OF EXEMPLARY EMBODIMENTS

1. First Embodiment

An electro-optical device according to a first embodiment of the invention uses liquid crystal as an electro-optical material. The electro-optical device 1 has a liquid crystal panel AA (an example of an electro-optical panel) as a main portion. The liquid crystal panel AA is formed by adhering the electrode forming surfaces of a device substrate, on which thin-film transistors (hereinafter, referred to as "TFTs") are formed as switching elements, and a counter substrate together with a predetermined gap therebetween so that they face each other and inserting liquid crystal into this gap.

Figure 1:
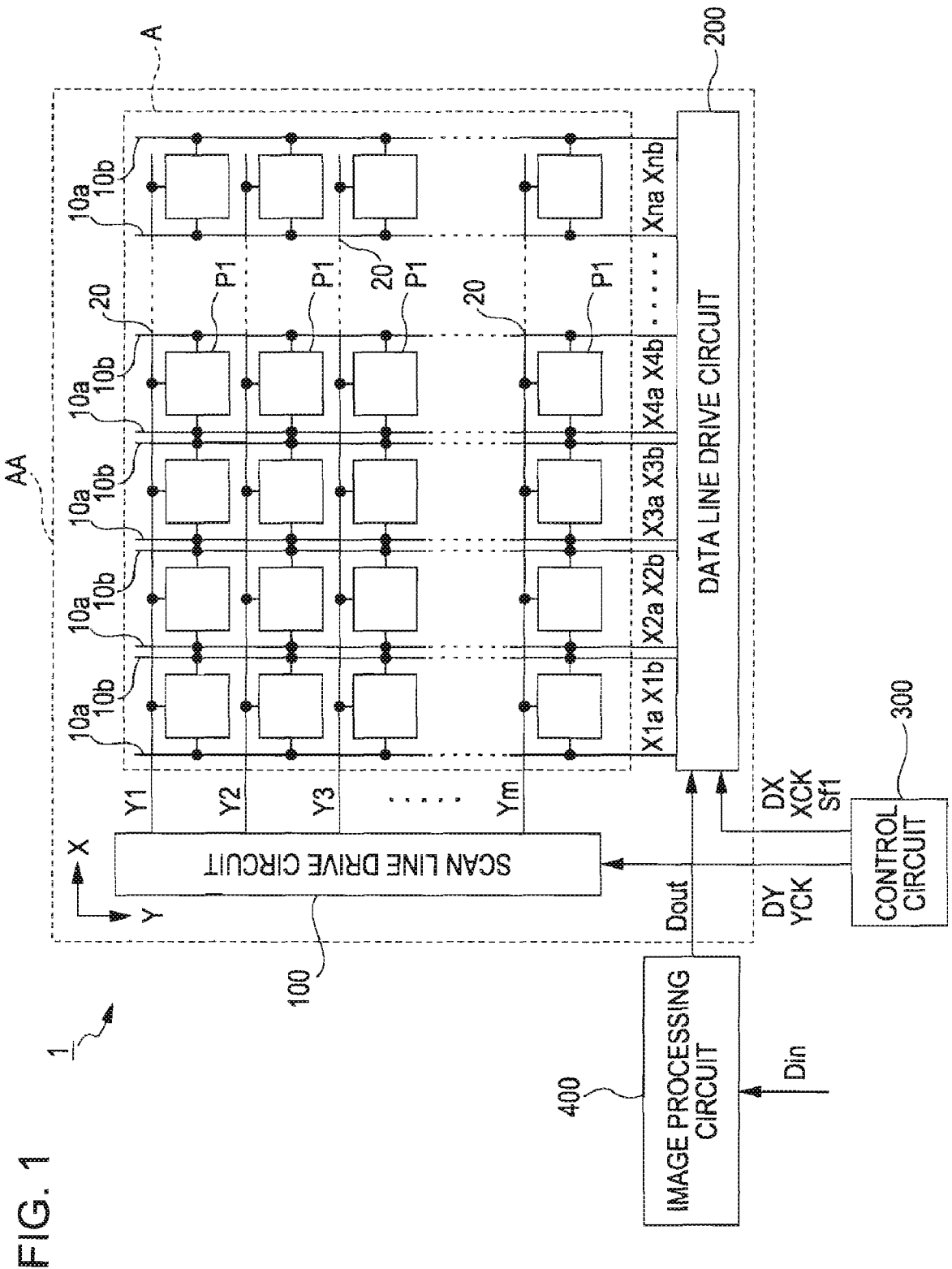
FIG. 1 is a block diagram showing the entire configuration of an electro-optical device according to a first embodiment of the invention.

FIG. 1 is a block diagram showing the entire configuration of the electro-optical device 1 according to the first embodiment of the invention. The electro-optical device 1 includes the liquid crystal panel AA, a control circuit 300, and an image processing circuit 400. The liquid crystal display AA is of a transmissive type, but may be of a semi-transmissive type or a reflective type. The liquid crystal panel AA includes an image display region A, a scan line drive circuit 100, and a data line drive circuit 200 on the device substrate. The control circuit 300 generates and supplies an X transmission start pulse DX, an X clock signal XCK and a first frame signal Sf1 to the data line drive circuit 200 and generates and supplies a Y transmission start pulse DY and a Y clock signal YCK to the scan line drive circuit 100. In the image display region A, a plurality of pixel circuits P1 are formed in a matrix and transmissivity can be controlled for each pixel circuit P1. Light from a backlight (not shown) is emitted through the pixel circuit P1. Accordingly, a gray scale display due to light modulation is made possible. The image processing circuit 400 image-processes input image data Din, generates output image data Dout, and outputs the output image data Dout to the data line drive circuit 200.

Next, the image display region A will be described. In the image display region A, m (m is an integer of 2 or more) scan lines 20 are arranged in parallel in an X direction and n (n is an integer of 2 or more) sets of first data lines 10a and second data lines 10b are arranged in parallel in a Y direction. A voltage line (not shown) for supplying ground GND is arranged in parallel in the X direction. The m (row)×n (column) pixel circuits P1 are arranged in correspondence with intersections of the scan lines 20 and the first and second data lines 10a and 10b.

First voltages X1a to Xna are supplied to the n first data lines 10a and second voltages X1b to Xnb are supplied to the n second data lines 10b. Scan signals Y1, Y2, . . . , Ym are linear-sequentially applied to the scan lines 20 in a pulsed manner. When a scan signal Yi of an $i^{th}$ scan line 20 becomes active, a first voltage Xja supplied through the first data line 10a and a second voltage Xjb supplied through the second data line 10b are written into a pixel circuit P1$(i,j)$ of an $i^{th}$ (i is an integer of $1 \leq i \leq m$) row and a $j^{th}$ (j is an integer of $1 \leq i \leq n$) column.

Figure 2:
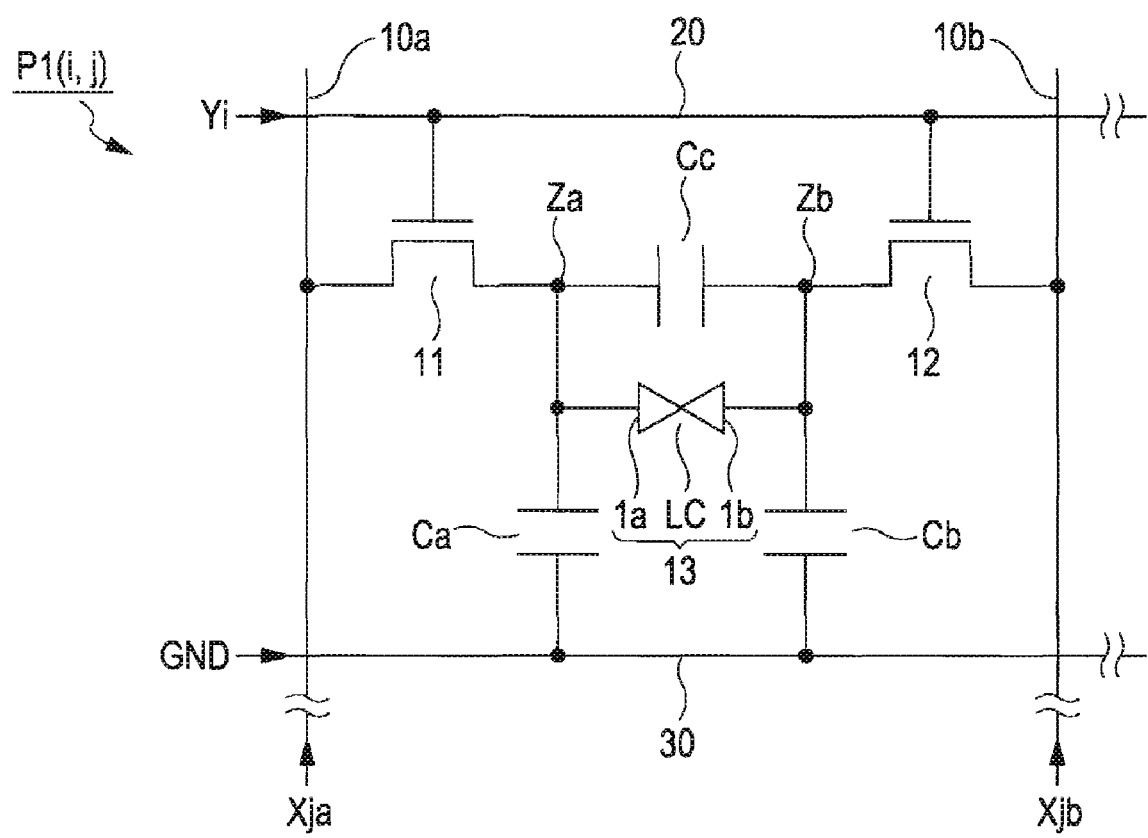
FIG. 2 is a circuit diagram showing a configuration example of a pixel circuit of the device.

FIG. 2 is a circuit diagram of the pixel circuit P1$(i, j)$ of the $i^{th}$ row and the $j^{th}$ column. The other pixel circuits P1 are configured similarly. As shown in FIG. 2, the pixel circuit P1$(i, j)$ includes n-channel conductive type transistors 11 and 12, a first hold capacitor Ca, a second hold capacitor Cb, a third hold capacitor Cc, and an electro-optical element 13.

The electro-optical element 13 is configured by inserting an electro-optical material between a first electrode 1a and a second electrode 1b. Any material whose optical characteristics vary in accordance with an applied voltage may be used as the electro-optical material and, in this example, liquid crystal LC is used.

The first electrode 1a of the electro-optical element 13 is connected to a first node Za and the second electrode 1b is connected to a second node Zb. The first hold capacitor Ca is provided between the first node Za and a voltage line 30 and the second hold capacitor Cb is provided between the second node Zb and the voltage line 30. Here, a portion or all of the first to third hold capacitors Ca, Cb and Cc may be formed as capacitive elements, parasitic capacitors which occur between the first electrode 1a and the second electrode 1b, or parasitic capacitors which occur between the first node Za or the second node Zb and the voltage line 30.

The transistor 11 is provided between the first node Za and the first data line 10a and the transistor 12 is provided between the second node Zb and the second data line 10b. The gates of the transistors 11 and 12 are connected to the scan line 20. When the scan signal Yi becomes of a high level (active), the transistors 11 and 12 are turned on. Then, the first voltage Xja is applied to the first electrode 1a of the electro-optical element 13 and is held in the first hold capacitor Ca. The second voltage Xjb is applied to the second electrode 1b of the electro-optical element 13 and is held in the second hold capacitor Cb. Accordingly, a voltage is applied to the liquid crystal which is the electro-optical material such that the transmissivity thereof is controlled.

FIG. 3 is a schematic partial enlarged view showing the structure of a fringe field switching (FFS) mode liquid crystal device as an example of the electro-optical device. FIG. 3A is a schematic plan view showing the structure of a portion of the liquid crystal device and FIG. 3B is a schematic cross-sectional view showing a portion of the liquid crystal device shown in FIG. 3A. Hereinafter, the structure of the FFS mode liquid crystal device will be described with reference to FIG. 3.

As shown in FIG. 3A, in the pixel circuit P1 of the liquid crystal device, the scan line 20 and the first and second data lines 10a and 10b are arranged so as to intersect each other. The transistor 11 is formed at a position corresponding to the intersection of the scan line 20 and the first data line 10a. The transistor 12 is formed at a position corresponding to the intersection of the scan line 20 and the second data line 10b. The transistor 11 is electrically connected to the first electrode 1a in which a slit is not provided. Here, the first electrode 1a has a substantially rectangular shape. The transistor 12 is electrically connected to the second electrode 1b having a slit shape. Hereinafter, the structure of the transistor 12 connected to the second electrode 1b will be described with reference to FIG. 3B.

As shown in FIG. 3B, an underlying insulating film 22 is formed on a glass substrate 21 and a semiconductor layer 23a is formed thereon. The semiconductor layer 23a may be, for example, formed of a polysilicon layer and includes a channel region 24 in which a channel is formed by an electric field from the scan line 20, and a source region 25 and a drain region 26 with the channel region interposed therebetween. In order to further reduce leakage current, it is preferable that the semiconductor layer 23a has a lightly doped drain (LDD) structure in which a low concentration region is provided in portions of the source region 25 and the drain region 26.

The scan line 20 made of high-melting-point metal such as titanium, chrome, tungsten, tantalum, or molybdenum or an alloy thereof is formed on top of the semiconductor layer 23a with a gate insulating film 27 interposed therebetween and made of silicon oxide. The scan line 20 functions as a gate electrode. The scan line 20 is arranged so as to face the U-shaped semiconductor layer 23a at two positions. Accordingly, the transistor 12 has a double gate structure. The transistor 12 includes the semiconductor layer 23a, the gate insulating film 27, and the scan line 20.

The second data line 10b is formed on top of the scan line 20 with an interlayer insulating film 28 interposed therebetween and is made of silicon oxide. The second data line 10b is made of a metal such as aluminum, chrome, or tungsten or an alloy thereof. As shown in FIG. 3A, the second data line 10b is arranged to be perpendicular to the scan line 20 and is electrically connected to one end of the semiconductor layer 23a. In more detail, the second data line 10b is electrically connected to the source region 25 of the semiconductor layer 23a through a contact hole 29a provided in the gate insulating film 27 and the interlayer insulating film 28.

A relay electrode 31 made of the same material as the second data line 10b is formed in the same layer as the second data line 10b. The relay electrode 31 is electrically connected to the drain region 26 of the semiconductor layer 23a through a contact hole 29b provided in the gate insulating film 27 and the interlayer insulating film 28.

The first electrode 1a made of indium tin oxide (ITO) and having transmissivity is formed on top of the second data line 10b and the relay electrode 31 with an interlayer insulating film 32 interposed therebetween and is made of silicon oxide. The first electrode 1a is independently provided for each pixel circuit P1. The first electrode 1a is electrically connected to the drain region of the transistor 11 (not shown) through a contact hole. The transistor 11 has the same configuration as the transistor 12.

The second electrode 1b made of ITO and having transmissivity is formed on top of the first electrode 1a with an interlayer insulating film 33 interposed therebetween and is made of silicon oxide. A plurality of slits are formed in a portion of the second electrode 1b which overlaps the first electrode 1a. The slits are arranged in parallel at a predetermined interval. The second electrode 1b is independently provided for each pixel circuit P1. The second electrode 1b is electrically connected to the relay electrode 31 via a contact hole 29c passing through the interlayer insulating films 32 and 33. The third hold capacitor Cc is configured by the first and second electrodes 1a and 1b which face each other and the interlayer insulating film 33 interposed therebetween.

Although the slits of the second electrode 1b are arranged in parallel at the predetermined interval, the slits are not limited to have this shape. The slits may be formed so as to allow the liquid crystal molecules in the liquid crystal LC to be controlled using an electric field applied in an oblique direction between the first electrode 1a and the second electrode 1b. For example, the slits of the second electrode 1b may be provided along the extending direction of the first data line 10a or the second data line 10b or the extending direction of the scan line 20. The slits of the second electrode 1b may be provided to have a predetermined angle with respect to the extending direction of the scan line 20 or may have first slits having a first angle and second slits having a second angle with the extending direction of the scan line 20.

An alignment film (not shown) made of polyimide is disposed on top of the second electrode 1b. The alignment film is a member which contacts liquid crystal (not shown) and may align liquid crystal molecules in a rubbing direction when a driving voltage is not applied (that is, an electric field is not applied), by the alignment film being subjected to rubbing in advance.

A constant potential line 35 is arranged in the same layer as the scan lines 20 in parallel with the scan lines 20. The potential of the constant potential line 35 is, for example, held at a ground voltage GND. The other end (the side of the drain region 26) of the semiconductor layer 23a extends to a region which overlaps the constant potential line 35 with the gate insulating film 27 interposed therebetween. Here, the gate insulating film 27 interposed between the constant potential line 35 and the semiconductor layer 23a functions as the second hold capacitor Cb.

Similarly, the other end (the side of the drain region) of the semiconductor layer 23b of the transistor 11 extends to a region which overlaps the constant potential line 35 with the gate insulating film 27 interposed therebetween. Here, the gate insulating film 27 interposed between the constant potential line 35 and the semiconductor layer 23b functions as the first hold capacitor Ca.

Although not shown in FIG. 3B, the first data line 10a is formed in the same layer as the second data line 10b. The first data line 10a is electrically connected to the source region (not shown) of the semiconductor layer 23b through a contact hole (not shown) passing through the gate insulating film 27 and the interlayer insulating film 28.

When the semiconductor layers 23a and 23b or the scan line 20 are formed, the hold capacitors Ca and Cb can be formed using the semiconductor layers 23a and 23b and the constant potential line 35 and thus the number of manufacturing processes is not increased. Since the third hold capacitor Cc is configured by the first and second electrodes 1a and 1b which face each other and the interlayer insulating film 33 interposed therebetween, it is not necessary to form a separate hold capacitor and it is possible to form a hold capacitor having the same area as the second electrode 1b. It is possible to hold a potential difference between the first electrode 1a and the second electrode 1b using the third hold capacitor Cc.

In such a configuration, when, a driving voltage is applied between the first electrode 1a and the second electrode 1b, an electric field related to the shapes of these electrodes is generated. In more detail, an electric field having electric flux lines that extend from the upper surface of the second electrode 1b to the upper surface of the first electrode 1a through the slits of the second electrode 1b is generated. At this time, the electric field generated at the upper side of the second electrode 1b (that is, a region in which the liquid crystal is provided) becomes a horizontal electric field having a component parallel to the glass substrate 21. The liquid crystal molecules are driven by the horizontal electric field and an alignment direction in the plane parallel to the glass substrate 21 is changed. According to the FFS mode liquid crystal device, a wide viewing angle can be obtained by driving the device such that the liquid crystal molecules are always parallel to the glass substrate 21.

Figure 4:
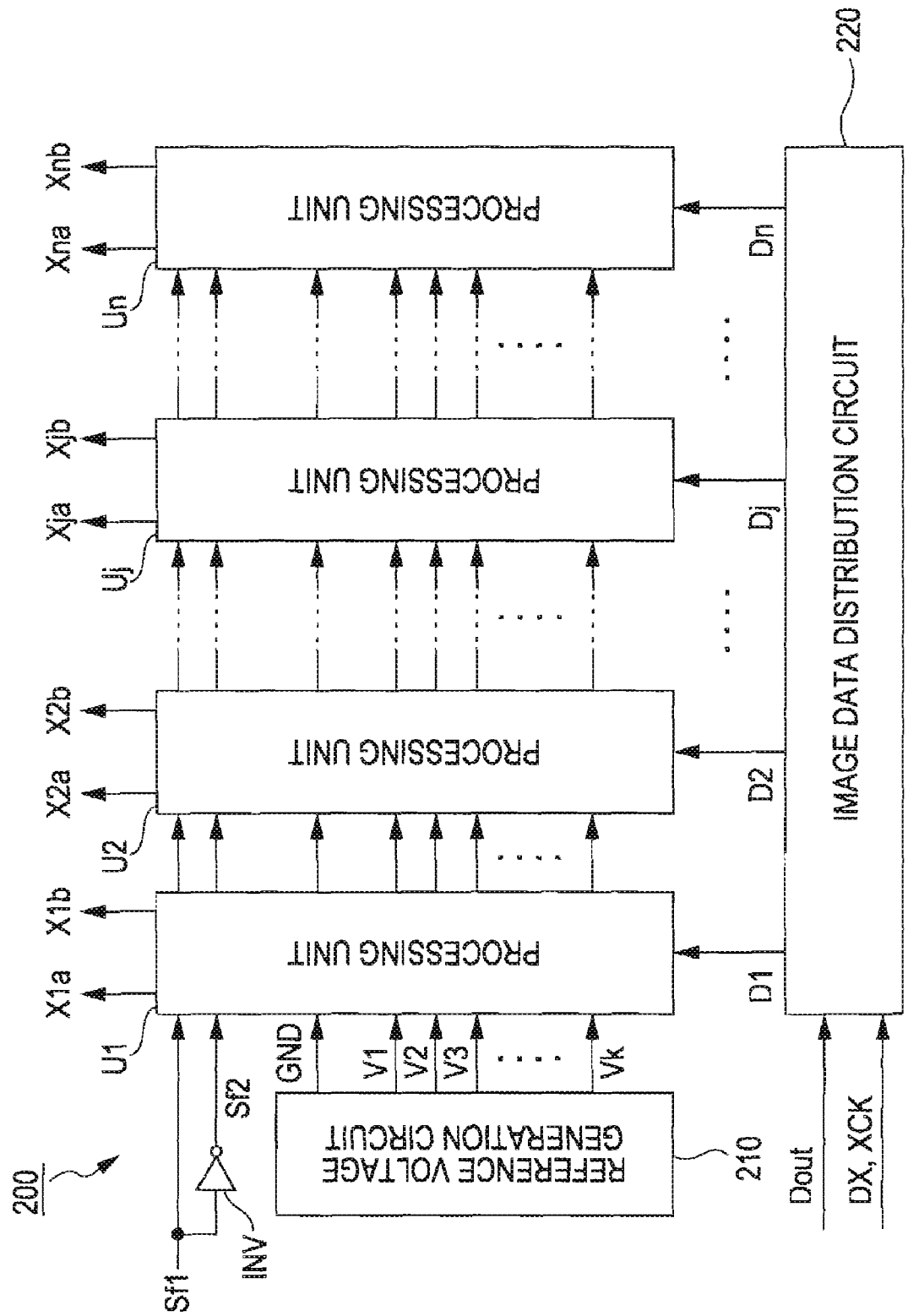
FIG. 4 is a block diagram showing the configuration of a data line drive circuit of the device.

FIG. 4 shows the configuration of the data line drive circuit 200. The data line drive circuit 200 includes processing units U1 to Un corresponding to n columns of pixel circuits P1, an inverter INV, a reference voltage generation circuit 210, and an image data distribution circuit 220. Among them, the image data distribution circuit 220 has n stages of shift registers and latch circuits. The shift registers sequentially transmit X transmission start pulses DX according to a clock signal XCK and sequentially generate n sampling pulses. The latch circuits output latched data to the processing units U1 to Un as image data Dout. The image data D1 to Dn specify k (k is an integer of 2 or more) gray scale levels. The reference voltage generation circuit 210 generates reference voltages V1 to Vk corresponding to the k gray scale levels and the ground voltage GND. The reference voltages V1 to Vk are set with consideration of gamma correction. A first frame signal Sf1 becomes of a high level in a first frame period F1 and becomes a low level in a second frame period F2. The inverter INV inverts the first frame signal Sf1 and generates the second frame signal Sf2. The second frame signal Sf2 becomes of a high level in the second frame period F2 and becomes a low level in the first frame period F1.

Figure 5:
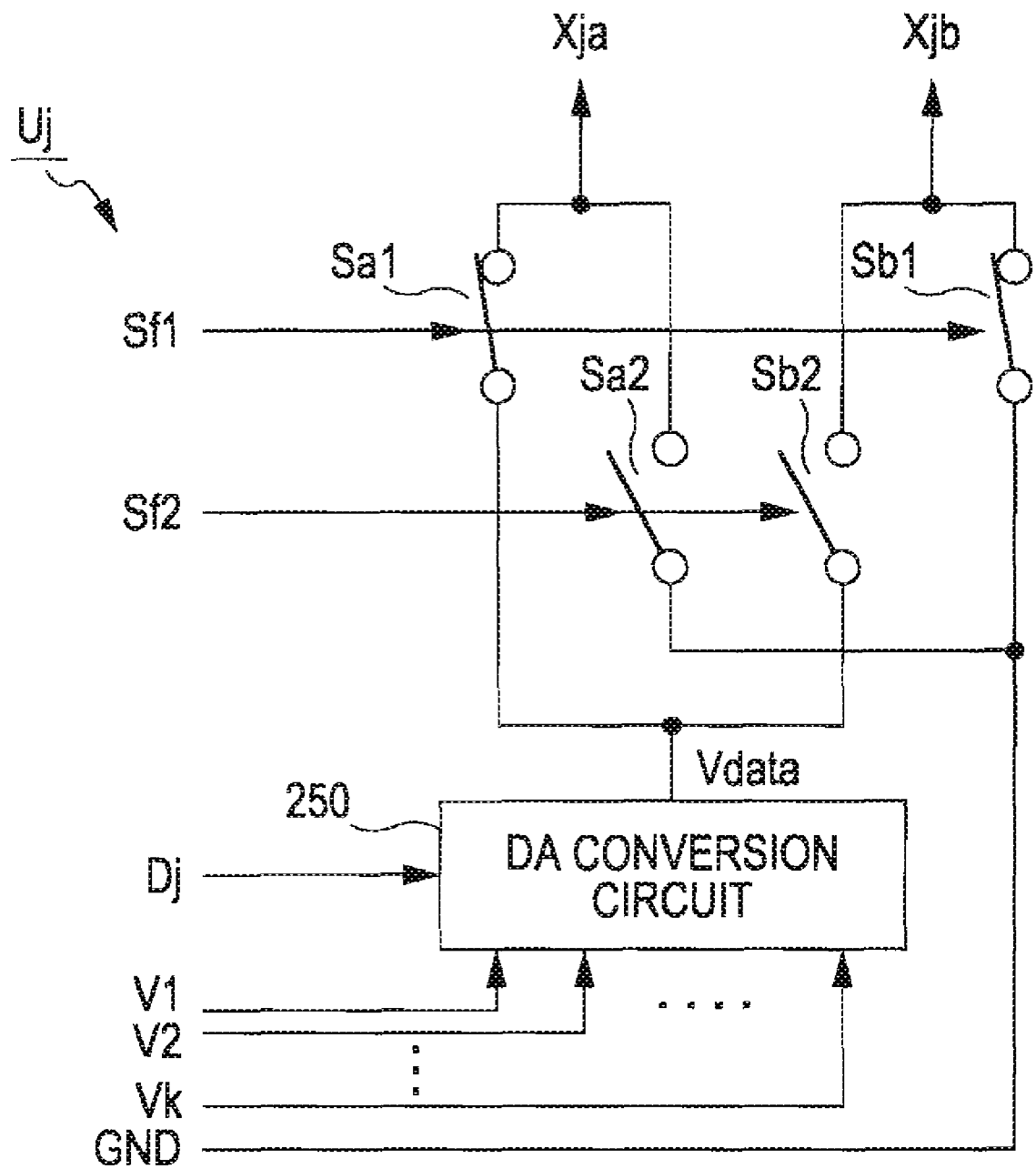
FIG. 5 is a block diagram showing the detailed configuration of a processing unit used in the device.

FIG. 5 shows the configuration of the processing unit Uj. The other processing units also have the same configuration. The processing unit Uj has a DA conversion circuit 250 and switches Sa1, Sa2, Sb1 and Sb2. The DA conversion circuit 250 includes a k-input 1-output demultiplexer and selects and outputs one of the reference voltages V1 to Vk according to the gray scale level of the image data Dj. Accordingly, the image data Dj can be converted from a digital signal into an analog signal.

The switch Sa1 is turned on in the first frame period F1 and supplies a data voltage Vdata output from the DA conversion circuit 250 to the first data line 10a as a first voltage Xja. The switch Sa2 is turned on in the second frame period F2 and supplies the ground voltage GND to the first data line 10a as the first voltage Xja. The switch Sb1 is turned on in the first frame period F1 and supplies the ground voltage GND to the second data line 10b as a second voltage Xjb. The switch Sb2 is turned on in the second frame period F2 and supplies the data voltage Vdata to the second data line 10b as the second voltage Xjb. As a result, in the first frame period F1, the first voltage Xja becomes the data voltage Vdata and the second voltage Xjb becomes the ground voltage GND. In the second frame period F2, the first voltage Xja becomes the ground voltage GND and the second voltage Xjb becomes the data voltage Vdata. The data voltage Vdata indicates a voltage according to the gray scale level to be displayed.

A relationship between the transmissivity of the liquid crystal LC and the applied voltage varies in accordance with the material of the liquid crystal LC. The gray scale level of the image data Dj and human visual characteristics of a person needs to be adjusted. In consideration of such a point, gamma correction for adjusting the voltage applied to the liquid crystal LC needs to be performed. In the present embodiment, the gamma correction is performed by adjusting the reference voltages V1 and Vk. In more detail, a resistance ladder is provided in the reference voltage generation circuit 210 and a resistance value of the resistance ladder is adjusted. Alternatively, a non-volatile memory is provided in the reference voltage generation circuit 210, specific data for specifying the reference voltages V1 to Vk is stored in the memory, and the specific data is read from the memory and DA-converted, thereby generating the reference voltages V1 to Vk.

If a voltage having a positive polarity and a voltage having a negative polarity are generated with respect to the common voltage VCOM, the voltage applied to the liquid crystal LC is shifted due to a push-down phenomenon and thus a reference voltage for the negative polarity needs to be separately generated in addition to the reference voltage for the positive reference. In contrast, in the present embodiment, the ground voltage GND (fixed voltage) is supplied to one of the first electrode 1a and the second electrode 1b, the data voltage Vdata according to the gray scale level to be displayed is supplied to the other thereof, and vice versa, thereby applying an AC voltage to the liquid crystal LC. Accordingly, although the voltage applied to the liquid crystal LC is reduced due to the push-down phenomenon, the level of the applied voltage is constant due to the polarity. As a result, since it is not necessary to switch the gamma correction according to the polarity of the applied voltage, the reference voltage generation circuit 210 has a simple configuration. That is, in the present embodiment, the same gamma correction is performed in the first frame period F1 and the second frame period F2 and the data voltage Vdata is generated by the same process.

Figure 6:
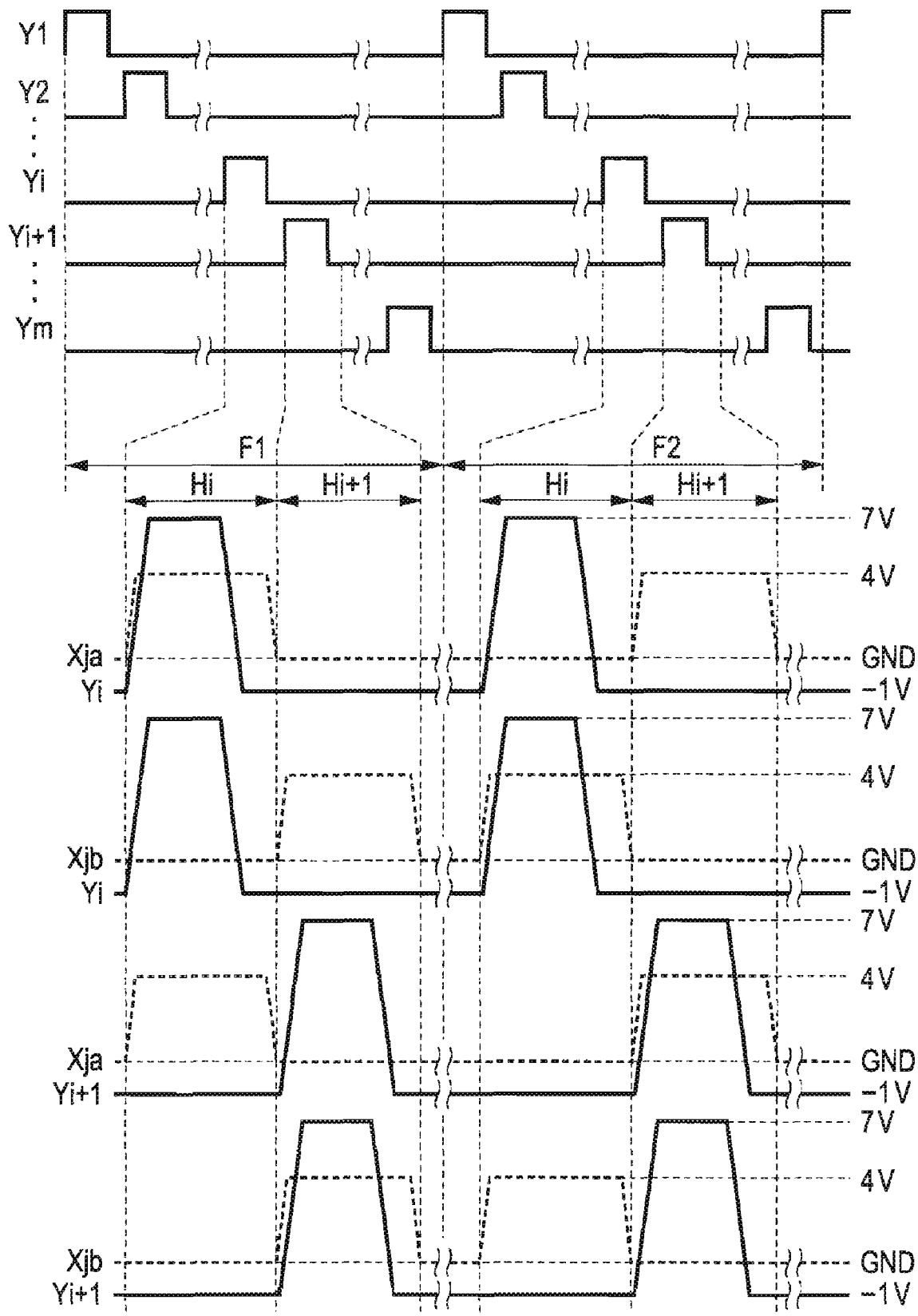
FIG. 6 is a circuit diagram showing a configuration example of an image display region of the device.

FIG. 6 is a timing chart explaining the operation of the electro-optical device 1. As shown, in an $i^{th}$ horizontal scan period Hi of the first frame period F1 (first period), a scan signal Yi becomes active. Then, the transistors 11 and 12 of the pixel circuit P1(i, j) are turned on, the first voltage Xja is applied to the first electrode 1a, and the second voltage Xjb is applied to the second electrode 1b. At this time, the first voltage Xja becomes the data voltage Vdata according to the gray scale level to be displayed and the second voltage Xjb becomes the ground voltage GND (fixed voltage). The voltage according to the gray scale level is held by the first hold capacitor Ca and the ground voltage GND is held by the second hold capacitor Cb. As a result, in the first frame period F1, the voltage of the first electrode 1a is higher than the ground voltage GND of the second electrode 1b.

In an $i^{th}$ horizontal scan period Hi of the second frame period F2 (second period), the transistors 11 and 12 of the pixel circuit P1(i, j) are turned on, the first voltage Xja is applied to the first electrode 1a, and the second voltage Xjb is applied to the second electrode 1b. The relationship between the first voltage Xja and the second voltage Xjb in the second frame period F2 is opposite to that in the first frame period F1. That is, in the second frame period F2, the first voltage Xja becomes the ground voltage GND and the second voltage Xjb becomes the data voltage Vdata. In the second frame period F2, the voltage of the second electrode 1b is higher than the ground voltage GND of the first electrode 1a.

By reversing the direction of the voltage applied to the electro-optical element 13 in the first frame period F1 and the second frame period F2, the AC voltage can be applied to the liquid crystal LC. An AC driving method includes a variety of systems as follows. In the following description, the polarity of the voltage applied to the liquid crystal LC is a positive polarity when the voltage of the first electrode 1a is higher than that of the second electrode 1b and is called a negative polarity when the voltage of the first electrode 1a is lower than that of the second electrode 1b.

In a V inversion system, a high voltage is supplied to all the first electrodes 1a and a ground voltage GND is supplied to the second electrode 1b in any frame (vertical scan) period and the ground voltage GND is supplied to all the first electrodes 1a and the high voltage is supplied to the second electrode 1b in a next frame period. In the V inversion system, in all the pixel circuits P1, the polarity of the voltage applied to the liquid crystal LC is common and the polarity of the applied voltage is inverted between adjacent frames.

In an S inversion system, a high voltage and a ground voltage are alternately supplied to the first electrode 1a for each data line (for each column) and the polarity of the voltage applied to the liquid crystal LC is inverted for each column, in any frame period. In a next frame period, the ground voltage GND is supplied to the first electrode 1a to which the high voltage is supplied in the previous frame period and the high voltage is supplied to the first electrode 1a to which the ground voltage GND is supplied in the previous frame period. In the S inversion system, the polarity of the voltage applied to the liquid crystal LC is inverted for each column and the polarity of the voltage applied to the liquid crystal LC is inverted between adjacent frames.

In a H inversion system, a high voltage and a ground voltage GND are alternately supplied to the first electrode 1a for each scan line (for each row) and the polarity of the voltage applied to the liquid crystal LC is inverted for each column, in any frame period. In a next frame period, the ground voltage GND is supplied to the first electrode 1a to which the high voltage is supplied in the previous frame period and the high voltage is supplied to the first electrode 1a to which the ground voltage GND is supplied in the previous frame period. In the H inversion system, the polarity of the voltage applied to the liquid crystal LC is inverted for each row and the polarity of the voltage applied to the liquid crystal LC is inverted between adjacent frames.

A dot inversion system is a combination of the S inversion system and the H inversion system. In the dot inversion system, a high voltage and a ground voltage GND are alternately supplied to the first electrode 1a for each scan line and data line (for each pixel unit) and the polarity of the voltage applied to the liquid crystal LC is inverted for each row and column, in any frame period. In a next frame period, the ground voltage GND is supplied to the first electrode 1a to which the high voltage is supplied in the previous frame period and the high voltage is supplied to the first electrode 1a to which the ground voltage GND is supplied in the previous frame period. In the dot inversion system, the polarity of the voltage applied to the liquid crystal LC is inverted for each row and column and the polarity of the voltage applied to the liquid crystal LC is inverted between adjacent frames.

The electro-optical device 1 according to the present embodiment may employ any one of the variety of systems, but the S inversion system is employed in this embodiment. As shown in FIG. 6, in an $i^{th}$ horizontal scan period Hi of the first frame period F1, the data voltage Vdata is supplied to the first electrode 1a as the first voltage Xja and the ground, voltage GND is supplied to the second electrode 1b as the second voltage Xjb in the pixel circuit P1($i, j$). Accordingly, in the first frame period F1, the polarity of the voltage applied to the liquid crystal LC of the pixel circuit P1($i, j$) becomes the positive polarity. Next, in an $i+1^{th}$ horizontal scan period Hi+1 of the first frame period F1, the data voltage Vdata is supplied to the second electrode 1b as the second voltage Xjb and the ground voltage GND is supplied to the first electrode 1a as the first voltage Xja in the pixel circuit P1($i+1, j$). Accordingly, in the first frame period F1, the polarity of the voltage applied to the liquid crystal LC of the pixel circuit P1($i+1, j$) becomes the negative polarity.

In an $i^{th}$ horizontal scan period Hi of the second frame period F2, the data voltage Vdata is supplied to the second electrode 1b as the second voltage Xjb and the ground voltage GND is supplied to the first electrode 1a as the first voltage Xja in the pixel circuit P1($i, j$).

Accordingly, in the second frame period F2, the polarity of the voltage applied to the liquid crystal LC of the pixel circuit P1($i, j$) becomes the negative polarity. Next, in an $i+1^{th}$ horizontal scan period Hi+1 of the second frame period F2, the data voltage Vdata is supplied to the first electrode 1a as the first voltage Xja and the ground voltage GND is supplied to the second electrode 1b as the second voltage Xjb in the pixel circuit P1($i+1, j$). Accordingly, in the first frame period F1, the polarity of the voltage applied to the liquid crystal LC of the pixel circuit P1($i+1, j$) becomes the positive polarity.

Figure 7:
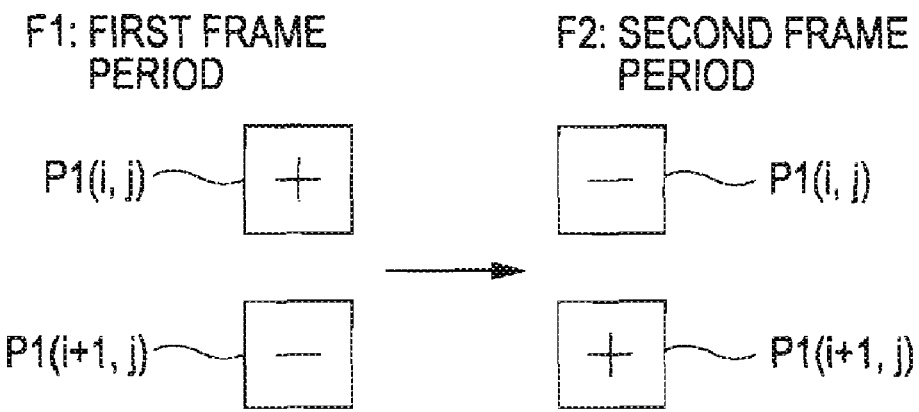
FIG. 7 is a conceptual diagram explaining the polarity of a voltage applied in a first frame period and a second frame period.

As a result, as shown in FIG. 7, the polarities of the voltages applied to the liquid crystal LC of the pixel circuit P1($i, j$) and the liquid crystal LC of the pixel circuit P1($i+1, j$) are inverted in the first frame period F1 and the second frame period F2, and the polarities of the voltages applied to the liquid crystal LC of the pixel circuit P1($i, j$) and the liquid crystal LC of the pixel circuit P1($i+1, j$) are inverted between the frames.

Figure 8:
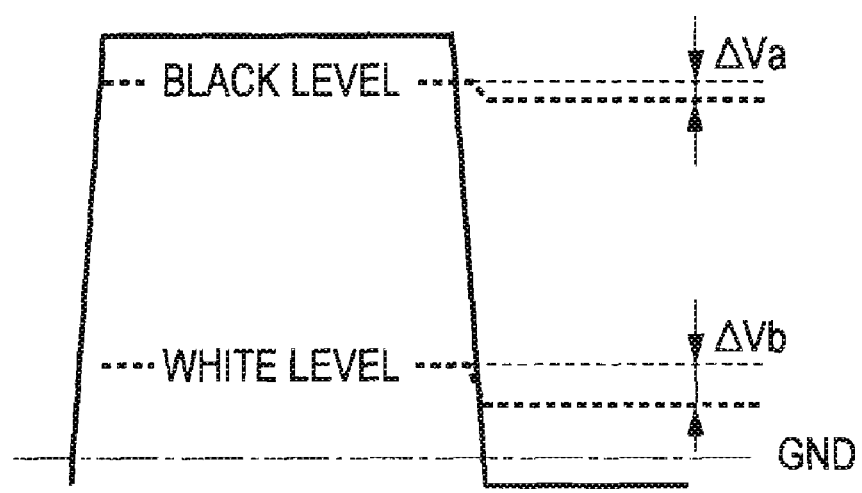
FIG. 8 is an explanation view explaining a push-clown phenomenon in the device.

However, at a timing when the scan signal Yi is switched from an active state to an inactive state, a push-down phenomenon in which the voltage applied to the liquid crystal LC is shifted. This phenomenon will be described with reference to FIG. 8. As shown in FIG. 8, due to the push-down phenomenon, a voltage drop of ΔVa occurs in a black level and a voltage drop of ΔVb occurs in a white level. In contrast, in the present embodiment, since the polarity is not inverted on the basis of the ground voltage GND, the same voltage drop occurs in the first frame period F1 and the second frame period F2. Accordingly, it is not necessary to switch the gamma correction and to adjust the ground voltage GND as the fixed voltage according to the inversion of the polarity. As a result, the configuration of the electro-optical device 1 can be simplified and the process of adjusting the fixed voltage can be omitted.

2. Second Embodiment

Next, an electro-optical device according to a second embodiment is equal to the electro-optical device according to the first embodiment shown in FIG. 1, except for the detailed configuration of the image display region A and the detailed configurations of the scan line drive circuit and the data line drive circuit.

Figure 9:
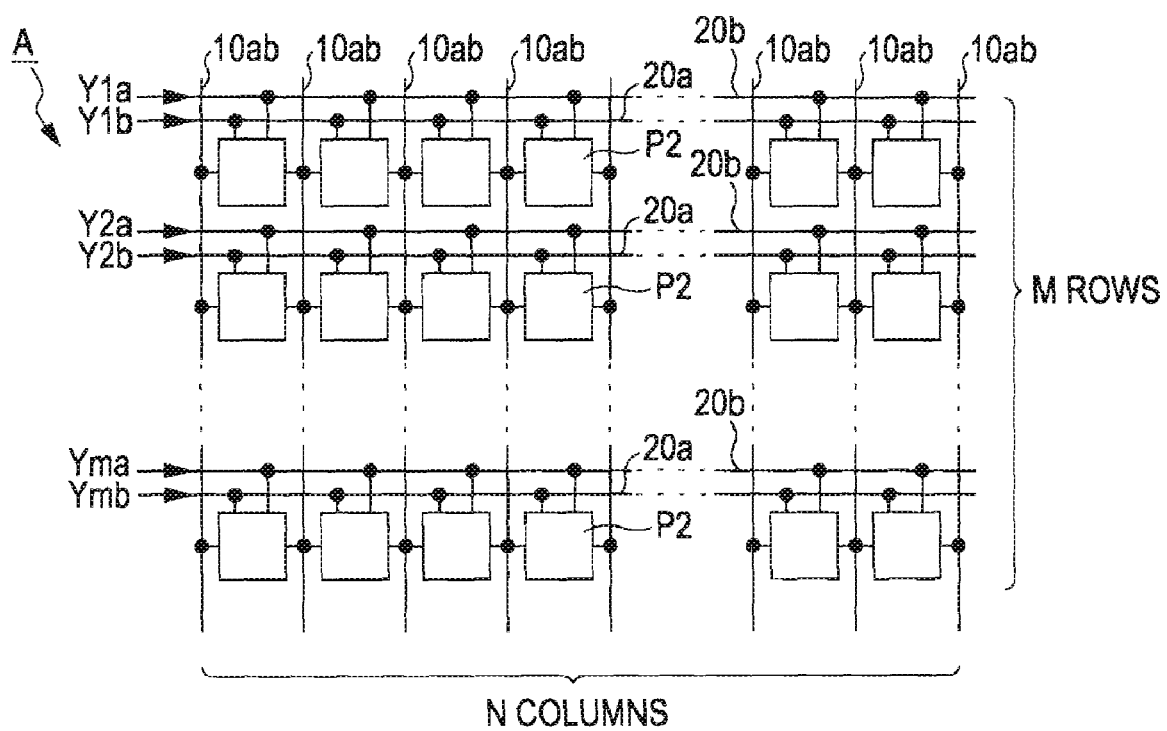
FIG. 9 is a block diagram showing the configuration of an image display region of an electro-optical device according to a second embodiment of the invention.

FIG. 9 shows the configuration of the image display region A in the electro-optical device according to the second embodiment. As shown, in the image display region A, pixel circuits P2 arranged in m rows and n columns are formed. In this embodiment, a set of a first scan line 20a and a second scan line 20b is arranged in each row, and n+1 data lines 10ab are arranged in a column direction. First scan signals Y1a to Yma are supplied to m first scan lines 20a and second scan signals Y1b to Ymb are supplied to m second scan lines 20b.

Figure 10:
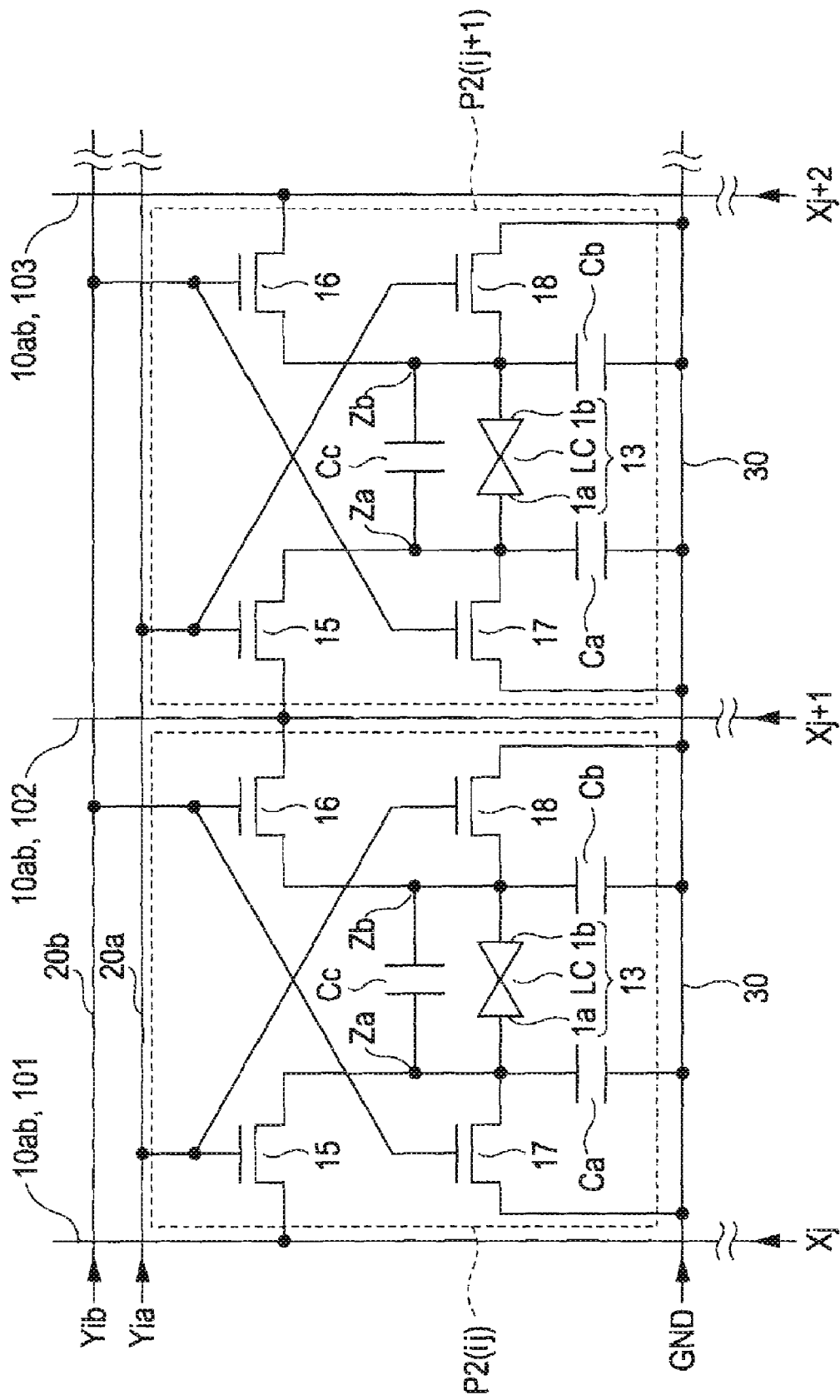
FIG. 10 is a circuit diagram of a pixel circuit used in the device.

FIG. 10 is a circuit diagram of a pixel circuit P2($i, j$) of the $i^{th}$ row and $j^{th}$ column and a pixel circuit P2($i, j+1$) of the $i^{th}$ row and $j+1^{th}$ column. The other pixel circuits P2 also nave the same configuration. In the following description, a left data line 10ab is denoted by a reference numeral "101", a central data line 10ab is denoted by a reference numeral "102", and a right data line 10a is denoted by a reference numeral "103".

In the pixel circuit P2($i, j$), a transistor 15 is provided between a first electrode 1a and the data line 101 and the gate thereof is connected to the first scan line 20a. A transistor 16 is provided between a second electrode 1b and the data line 102 and the gate thereof is connected to the second scan line 20b. A transistor 17 is provided between the first electrode 1a and a voltage line 30 and the gate thereof is connected to the second scan line 20b. A transistor 18 is provided between the second electrode 1b and the voltage line 30 and the gate thereof is connected to the first scan line 20a.

The first electrode 1a is connected to a first node Za and the second electrode 1b is connected to a second node. A first hold capacitor Ca is provided between the first node Za and the voltage line 30, a second hold capacitor Cb is provided between the second node Zb and the voltage line 30, and a third hold capacitor Cc is provided between the first node Za and the second node Zb.

In the above configuration, the transistors 15 and 18 are simultaneously turned on and the transistors 16 and 17 are simultaneously turned on. In the pixel circuit P2($i, j$), when the transistors 15 and 18 are turned on, a data voltage Xi is supplied to the first electrode 1a through the data line 101 and a ground voltage GND is supplied to the second electrode 1b. When the transistors 15 and 18 are turned on, the ground voltage GND is supplied to the first electrode 1a and a data voltage Xi+1 is supplied to the second electrode 1b through the data line 102.

Figure 11:
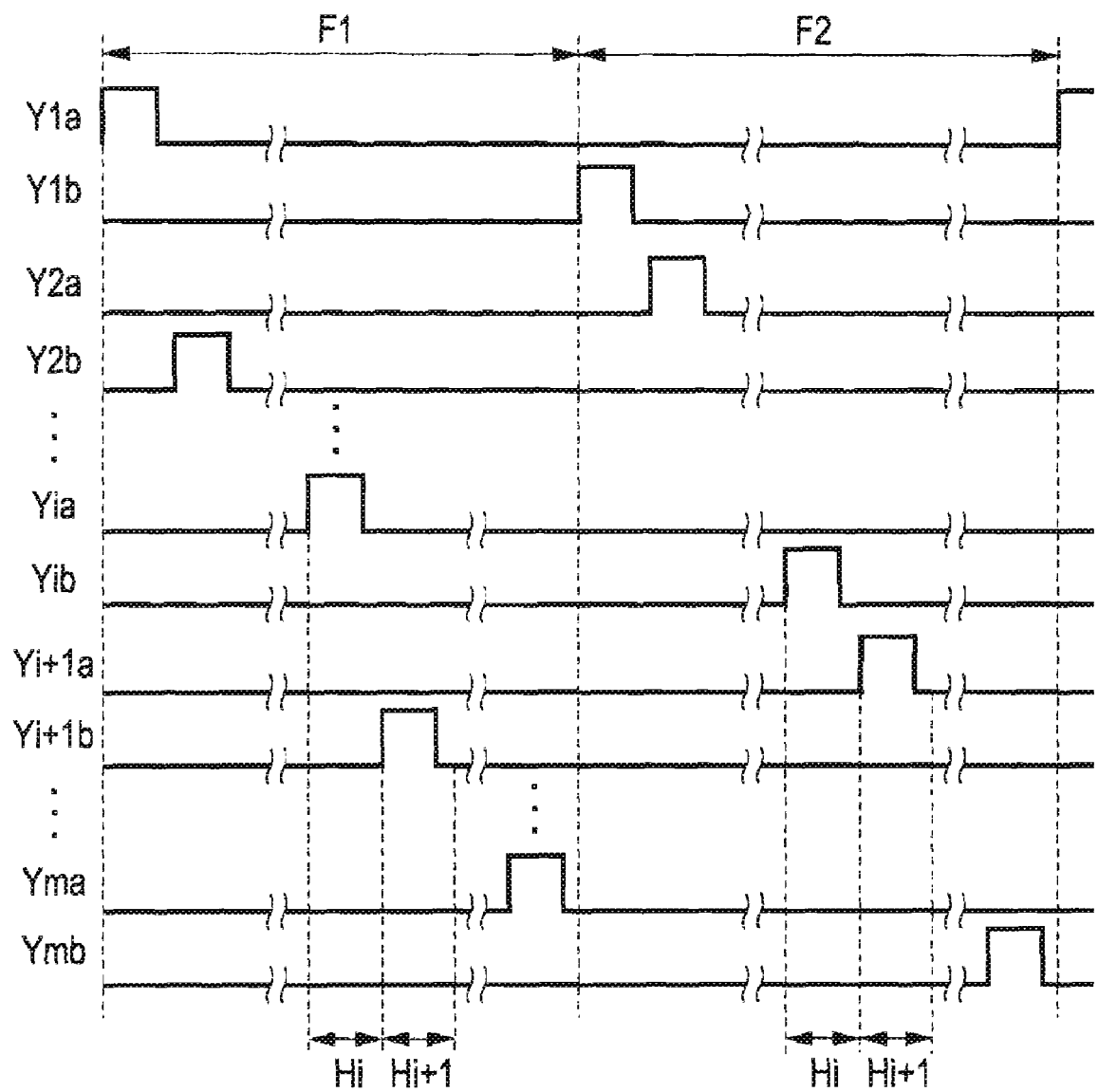
FIG. 11 is a timing chart explaining an operation of the device.
Figure 12:
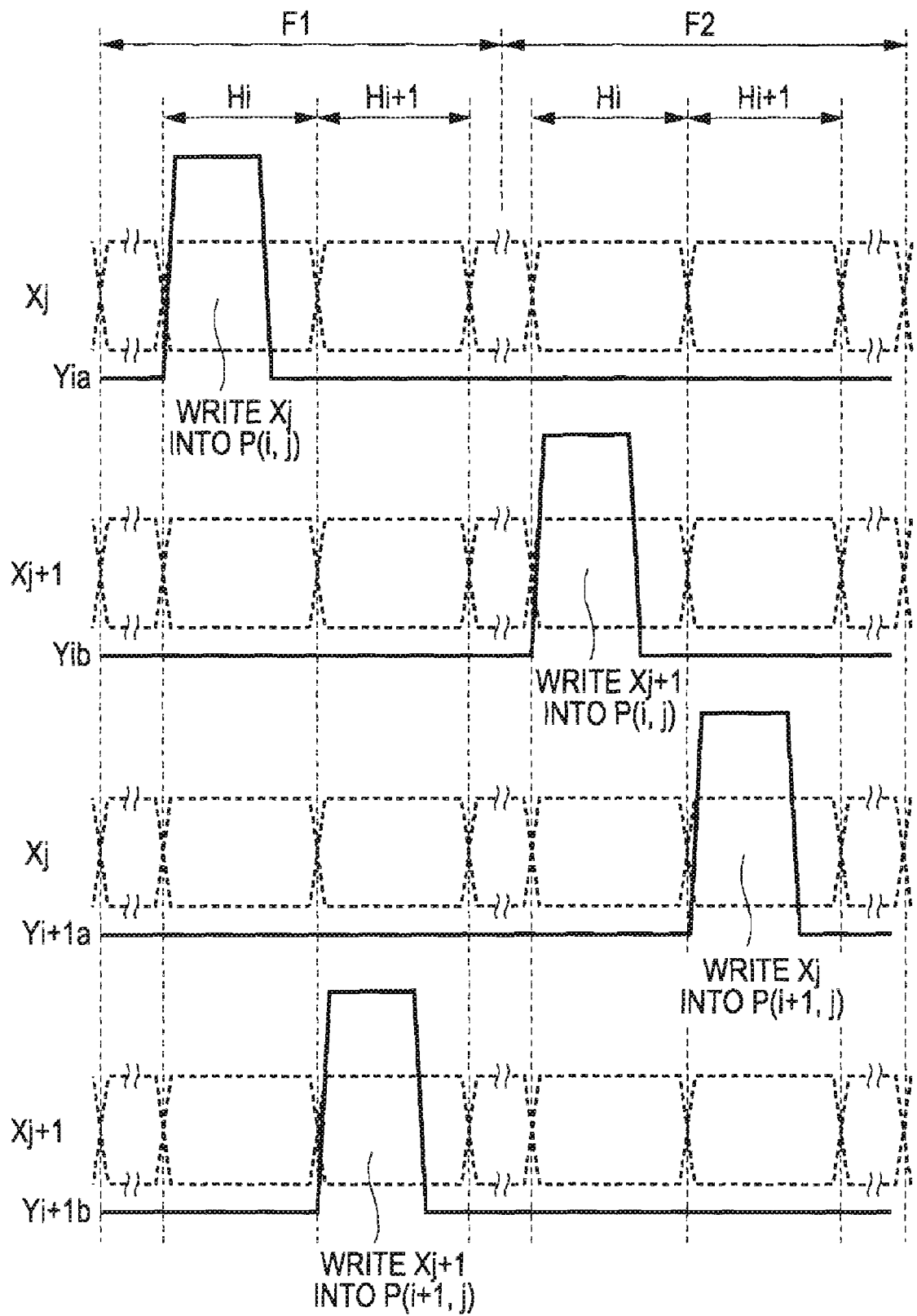
FIG. 12 is a timing chart explaining an operation of the device.

FIGS. 11 and 12 are timing charts explaining the operation of the electro-optical device according to the second embodiment. As shown in FIG. 11, in a first frame period F1, a scan signal becomes of a high level in order of Y1a, Y2b, Y3a, Y4b, . . . , Yia, Yi+1b, . . . , and Yma, and in a second frame period F2, the scan signal becomes of a high level in order of Y1b, Y2a, Y3b, Y4a, . . . , Yib, Yi+1a, . . . , and Ymb. In the second frame period F2, a scan line other than a scan line selected from the set of the first scan line 20a and the second scan line 20b in the first, frame period F1 is selected in each row. That is, in the scan line drive circuit 100 according to the present embodiment, in the first frame period F1, m sets of scan lines are sequentially selected and any one side of the first scan signals Y1a to Yma and the second scan signals Y1b to Ymb is valid and the other side thereof is invalid when one set of scan lines is selected. In the second frame period F2, m sets of scan lines are sequentially selected and any one side, which is valid in the first frame period F1, of the first scan signals Y1a to Yma and the second scan signals Y1b to Ymb is valid and the other side thereof is valid when one set of scan lines is selected.

Figure 13:
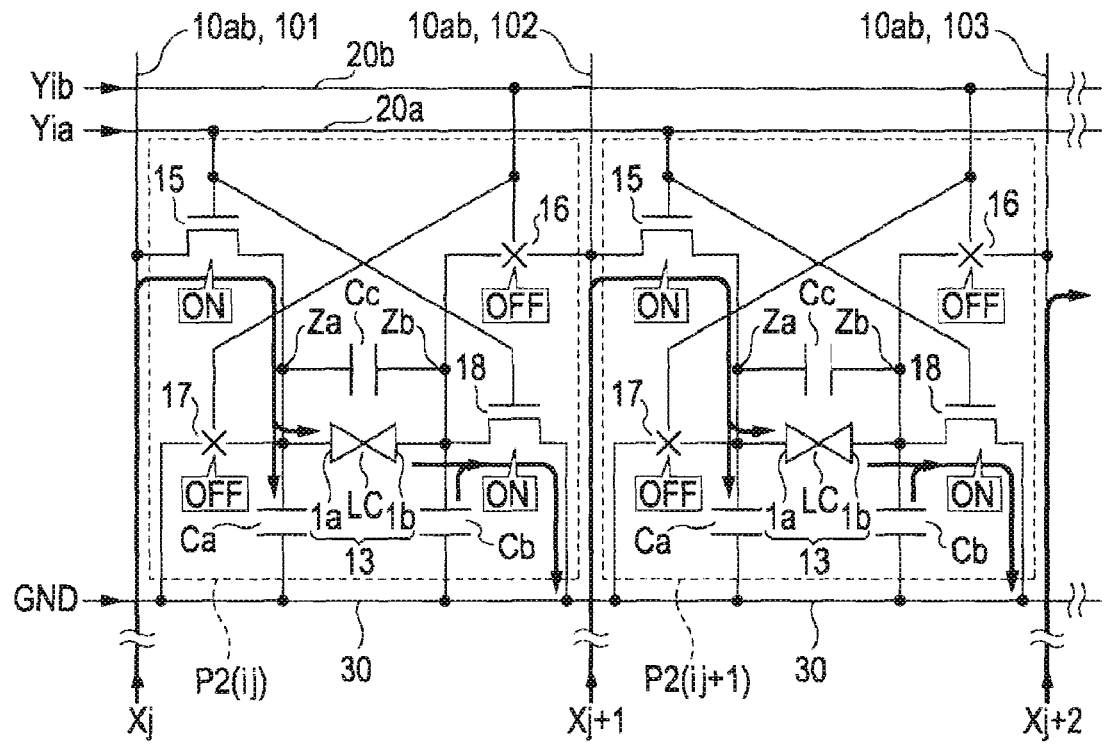
FIG. 13 is an explanation view explaining the flow of a signal in the pixel circuit of the device.

In the example shown in FIG. 12, in an $i^{th}$ horizontal scan period Hi of the first frame period F1, the first scan signal Yia becomes of a high level and the second scan signal Yib is held at a low level. At this time, as shown in FIG. 13, the transistors 15 and 18 are turned on and the transistors 16 and 17 are turned off. Accordingly, in the pixel circuit P2($i$, $j$), the data voltage Xj supplied through the data line 101 is applied to the first electrode 1a and the second electrode 1b is connected to the voltage line 30. In the pixel circuit P2($i$, $j$+1), the data voltage Xj+1 supplied through the data line 102 is applied to the first electrode 1a and the second electrode 1b is connected to the voltage line 30.

Figure 14:
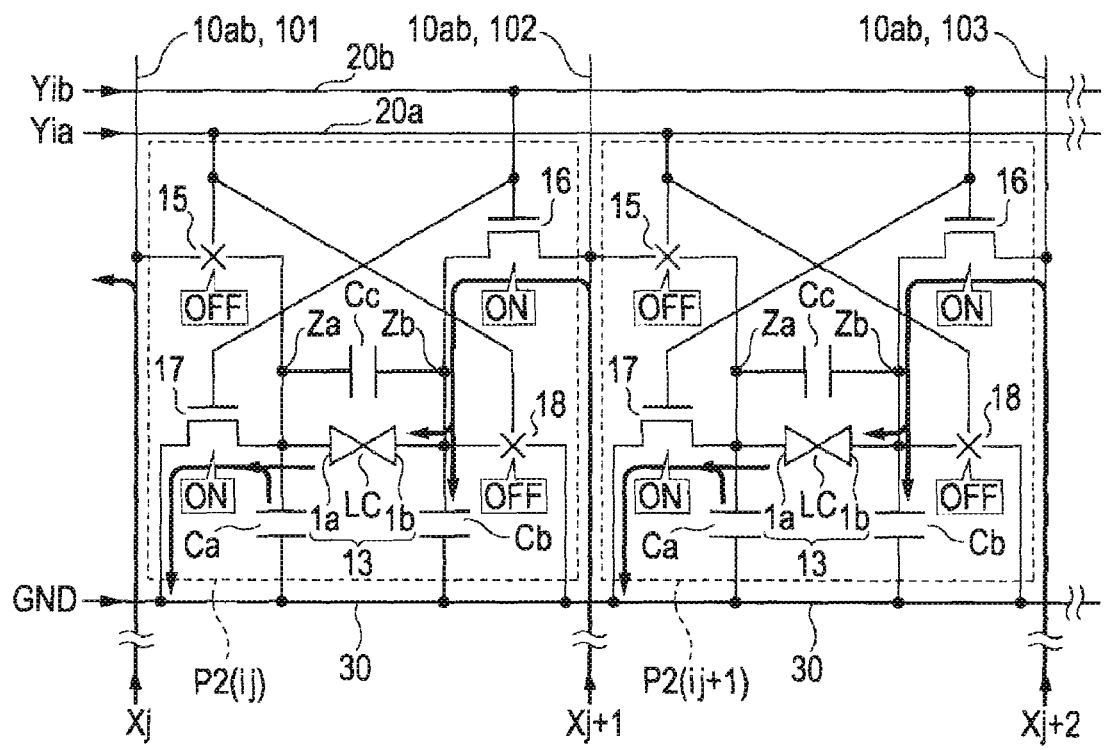
FIG. 14 is an explanation view explaining the flow of a signal in the pixel circuit of the device.

Next, in an $i^{th}$ horizontal scan period Hi of the second frame period F2, the second scan signal Yib becomes of a high level and the first scan signal Yia is held at a low level. At this time, as shown in FIG. 14, the transistors 16 and 17 are turned on and the transistors 15 and 18 are turned off. Accordingly, in the pixel circuit P2($i$, $j$), the data voltage Xj+1 supplied through the data line 102 is applied to the second electrode 1b and the second electrode 1a is connected to the voltage line 30. In the pixel circuit P2($i$, $j$+1), the data voltage Xj+1 supplied through the data line 103 is applied to the second electrode 1b and the first electrode 1a is connected to the voltage line 30. That is, in the data line drive circuit 200 of this example, in the first frame period F1, the data voltage Vdata according to the gray scale level to be displayed is supplied to odd-numbered data lines 101 and 103 and the ground voltage GND is supplied to even-number data line 102, and, in the second frame period F2, the ground voltage GND is supplied to the odd-numbered data lines 101 and 103 and the data voltage Vdata is supplied to the even-numbered, data line 102. Since the data line 102 also functions the pixel circuit P2($i$, $j$) and the pixel circuit P2($i$, $j$+1), the number of data lines 10ab can be reduced to about ½.

3. Third Embodiment

Next, an electro-optical device according to a third embodiment is equal to the electro-optical device according to the first embodiment shown in FIG. 1, except for the detailed configuration of the image display region A and the detailed configurations of the scan line drive circuit and the data line drive circuit.

Figure 15:
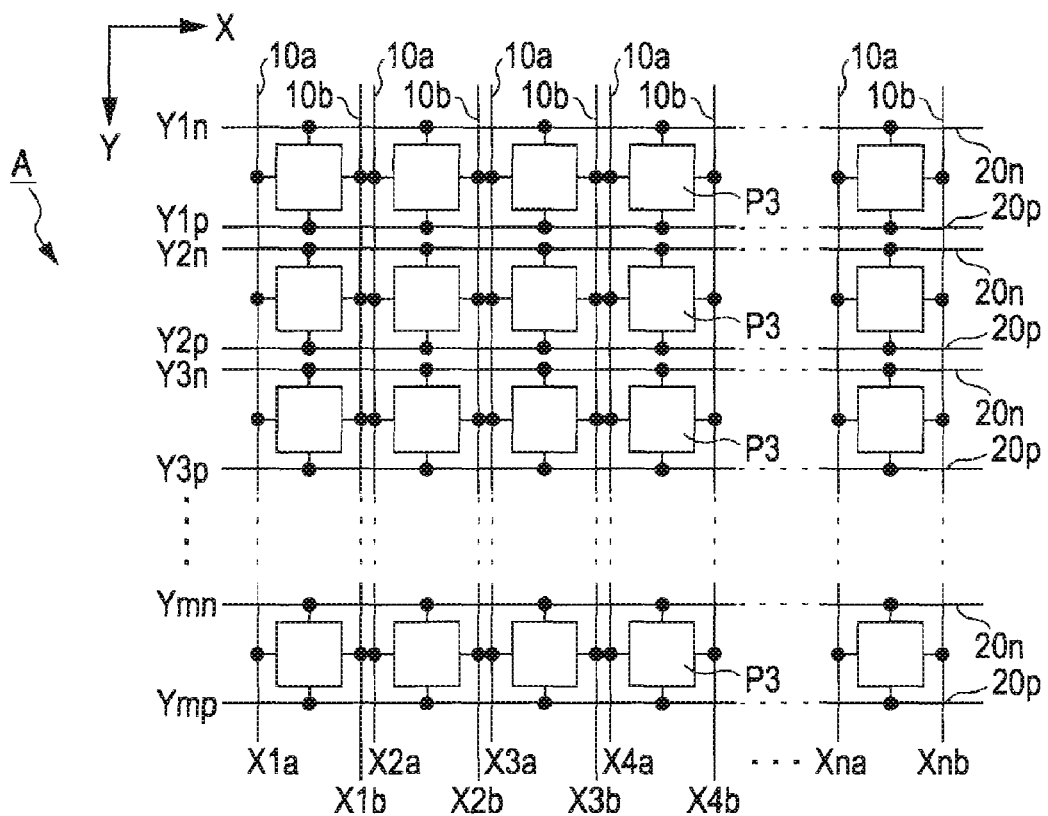
FIG. 15 is a block diagram showing the configuration of an image display region of an electro-optical device according to a third embodiment of the invention.

FIG. 15 shows the configuration of the image display region A in the electro-optical device according to the third embodiment. As shown, in the image display region A, pixel circuits P3 arranged in m rows and n columns are formed. In this embodiment, a set of a first scan line 20n and a second scan line 20p is arranged in each row, and n first data lines 10a and n second data lines 10b are arranged in a column direction. First scan signals Y1n to Ymn are supplied to m first scan lines 20n and second scan signals Y1p to Ymp are supplied to m second scan lines 20p. In addition, first voltages X1a to Xna are supplied to the n first data lines 10a and second voltages X1b to Xnb are supplied to the n second data lines 10b.

Figure 16:
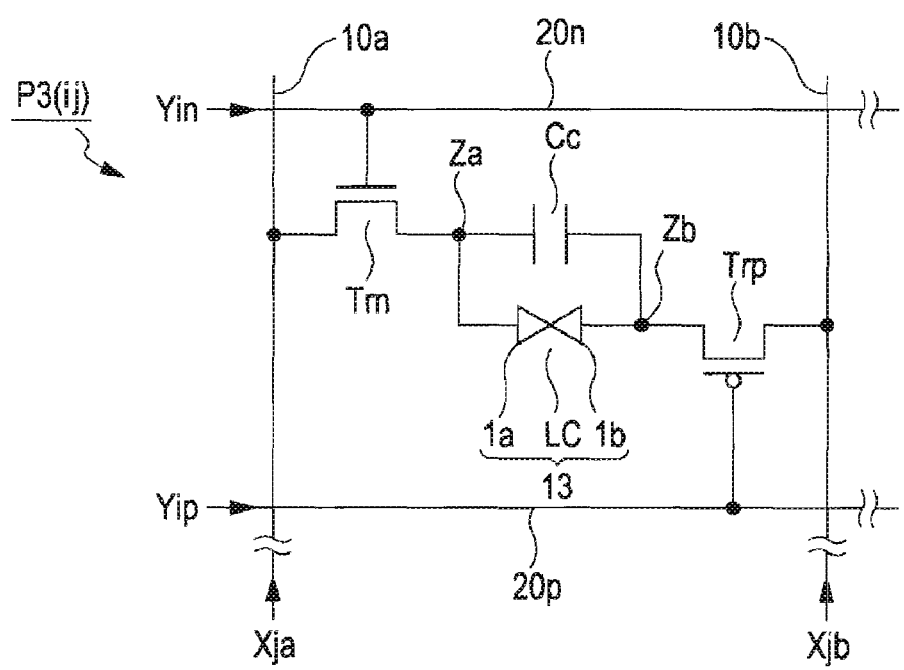
FIG. 16 is a circuit diagram of a pixel circuit used in the device.

FIG. 16 is a circuit diagram of a pixel circuit P3($i$, $j$) of the $i^{th}$ row and $j^{th}$ column. The other pixel circuits P3 also have the same configuration. The pixel circuit P3($i$, $j$) has an n-channel-type transistor Trn, a p-channel-type transistor Trp, a hold capacitor Cc, and an electro-optical element 13. The gate of the transistor Trn is connected to the first scan line 20n and the gate of the transistor Trp is connected, to the second scan line 20p. The transistor Trn is provided between the first data line 10a and a first node Za, and the transistor Trp is provided between the second data line 10b and a second node Zb.

Figure 17:
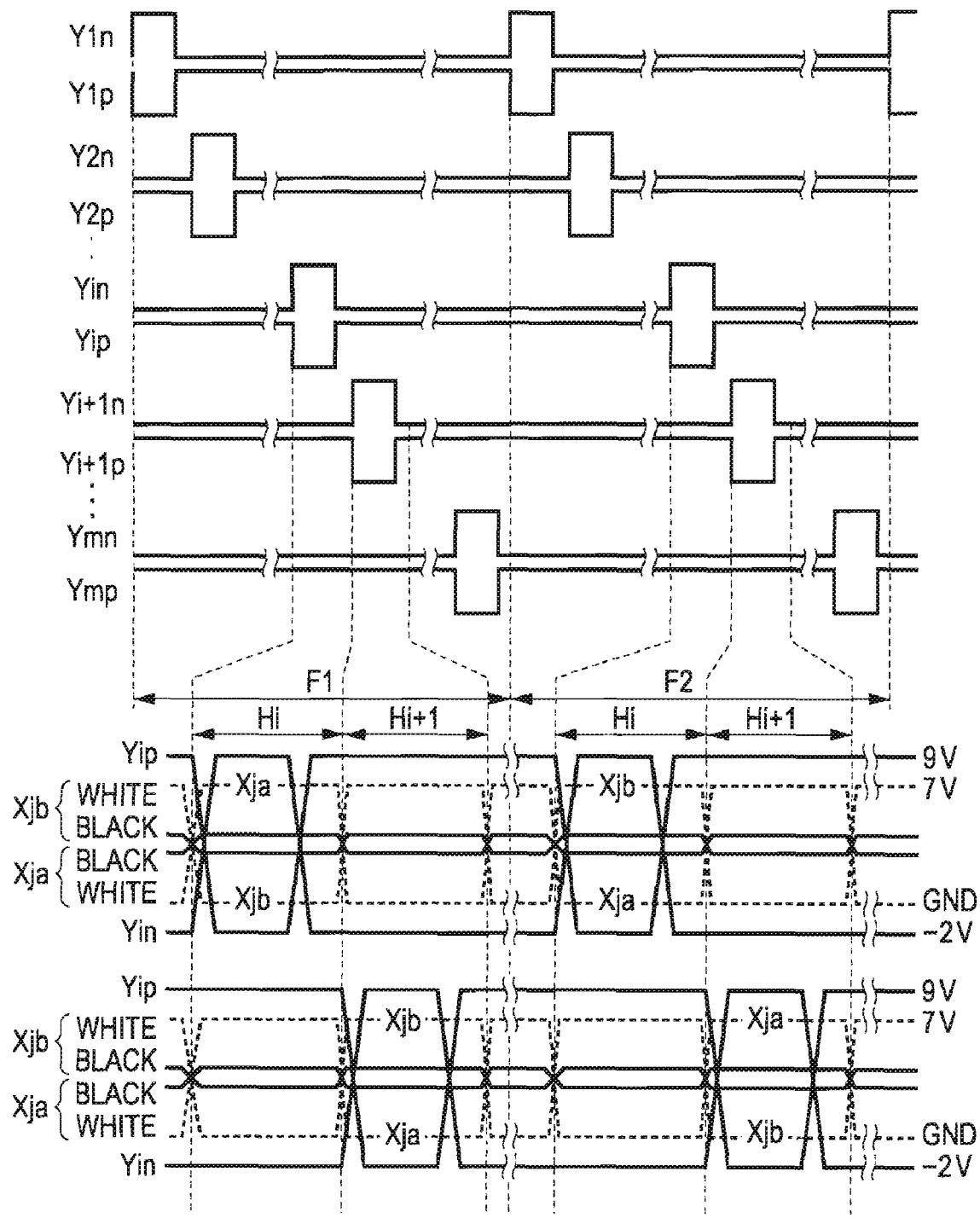
FIG. 17 is a timing chart explaining an operation of the device.

FIG. 17 is a timing chart explaining the operation of the electro-optical device according to the third embodiment. As shown in FIG. 17, the first scan signals Y1n to Ymn sequentially become and active state (high level). The second scan signals Y1p to Ymp are obtained by inverting the first scan signals Y1n to Ymn. Accordingly, the rows are sequentially selected and the first voltages X1a to Xna and the second voltages X1b to Xnb are written into the pixel circuits P3 of the selected row.

In an $i^{th}$ horizontal scan period Hi of the first frame period F1, if the first scan signal Yia transitions from a low level to a high level and the second scan signal transitions from the high level to the low level, the transistor Trn and the transistor Trp are turned on in the pixel circuit P3($i$, $j$). At this time, a first voltage Xja is supplied to the first electrode 1a, a second voltage Xjb is supplied to the second electrode 1b, a voltage is applied to the liquid crystal LC, and the applied voltage is held by the hold capacitor Cc. In this embodiment, the first voltage Xja and the second voltage Xjb have opposite polarities on the basis of the amplitude thereof and the polarities thereof are inverted for each horizontal scan period and for each frame period. As a result, in the pixel circuit P3($i$, $j$), the voltage of the first electrode 1a is higher than that of the second electrode 1b in the first frame period F1 and the voltage of the first electrode 1a is lower than that of the second electrode 1b in the second frame period F2. Accordingly, it is possible to invert the polarity of the voltage applied to the liquid crystal LC. Although the dot inversion system is employed as the AC driving system in this embodiment, the V inversion system, the S inversion system or the H inversion system may be employed. According to the pixel circuit P3 of the third embodiment, since a voltage is applied to the liquid crystal LC by a difference between the first voltage Xja and the second voltage Xjb, the amplitudes of the first voltage Xja and the second voltage Xjb can be reduced. As a result, it is possible to reduce the voltages of the data line drive circuit 200 and the scan line drive circuit 100.

4. Electronic Apparatus

Figure 18:
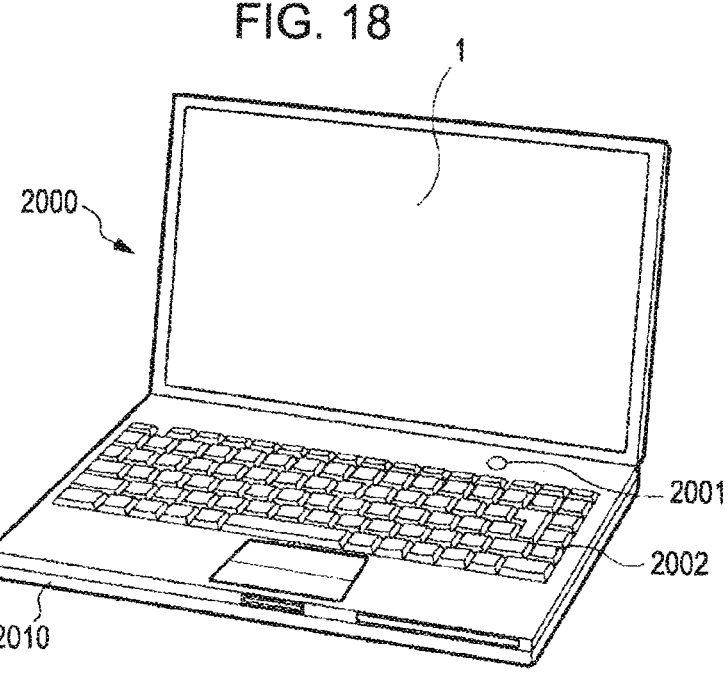
FIG. 18 is a perspective view showing the configuration of a personal computer which is an example of an electronic apparatus using an electro-optical device.

Next, an electronic apparatus using the electro-optical device 1 according to the above-described embodiment will be described. FIG. 18 shows the configuration of a mobile personal computer using the electro-optical device 1. The personal computer 200 includes the electro-optical device 1 functioning as a display unit and a main body 2010. The main body 2010 includes a power switch 2001 and a keyboard 2002.

Figure 19:
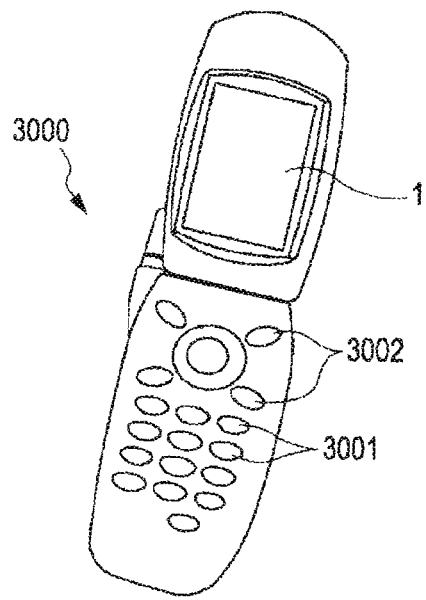
FIG. 19 is a perspective view showing the configuration of a mobile telephone which is an example of an electronic apparatus using an electro-optical device.

FIG. 19 shows the configuration of a mobile telephone using the electro-optical device 1. The mobile telephone 3000 includes a plurality of operation buttons 3001 and scroll buttons 3002 and the electro-optical device 1 functioning as a display unit. A screen displayed on the electro-optical device 1 is scrolled by operating the scroll button 3002.

Figure 20:
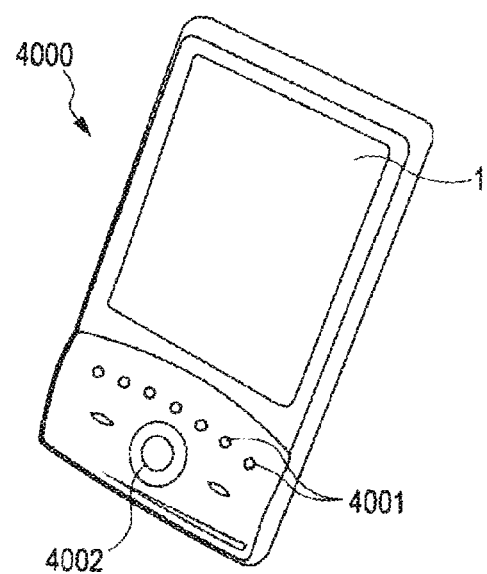
FIG. 20 is a perspective view showing the configuration of a personal digital assistant which is an example of an electronic apparatus using an electro-optical device.

FIG. 20 shows the configuration of a personal digital assistant (PDA) using the electro-optical device 1. The PDA 4000 includes a plurality of operation buttons 4001, a power switch 4002, and the electro-optical device 1 functioning as a display unit. When the power switch 4002 is operated, a variety of information such as an address book or a schedule book is displayed on the electro-optical device 1.

As an electronic apparatus using the electro-optical device, in addition to those shown in FIGS. 18 to 20, there are a liquid crystal television set, a viewfinder-type or direct-view monitor type video tape recorder, a car navigation system, a pager, an electronic organizer, an electronic calculator, a word processor, a workstation, a videophone, a POS terminal, a touch-panel-equipped device. The above-described electro-optical device 1 can be applied as a display unit of each of the variety of electronic apparatuses.

The invention is not limited to the above-described embodiments and the following examples may be implemented.

MODIFIED EXAMPLE 1

Figures 21A, 21B:
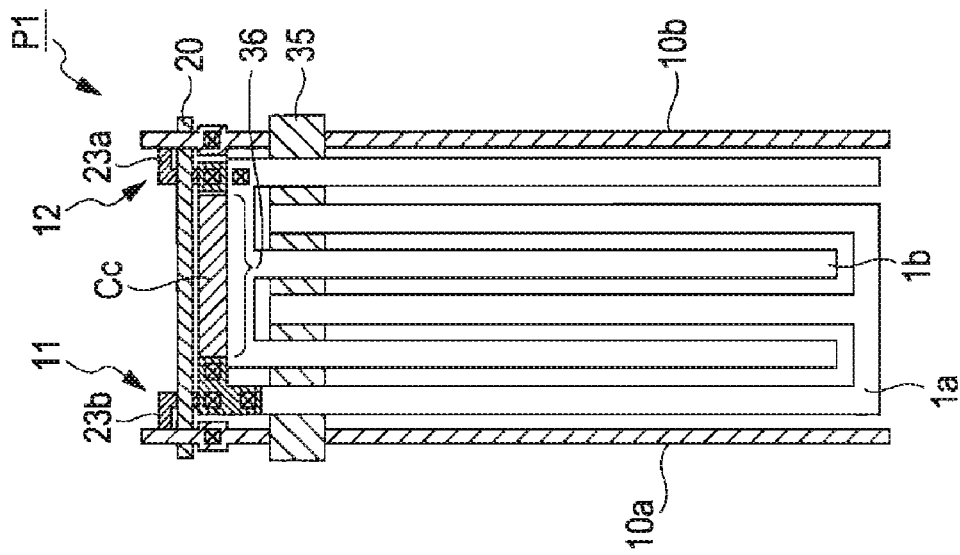
FIG. 21A is a plan view thereof and FIG. 21B is a cross-sectional view thereof.
Figure 22:
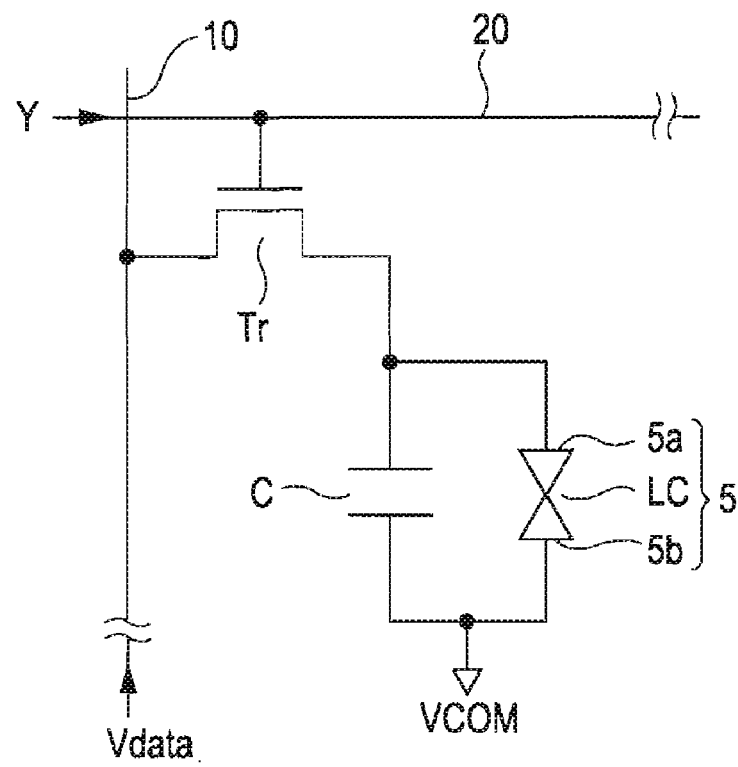
FIG. 22 is a circuit diagram showing the configuration of a pixel circuit in a related art.
Figure 23:
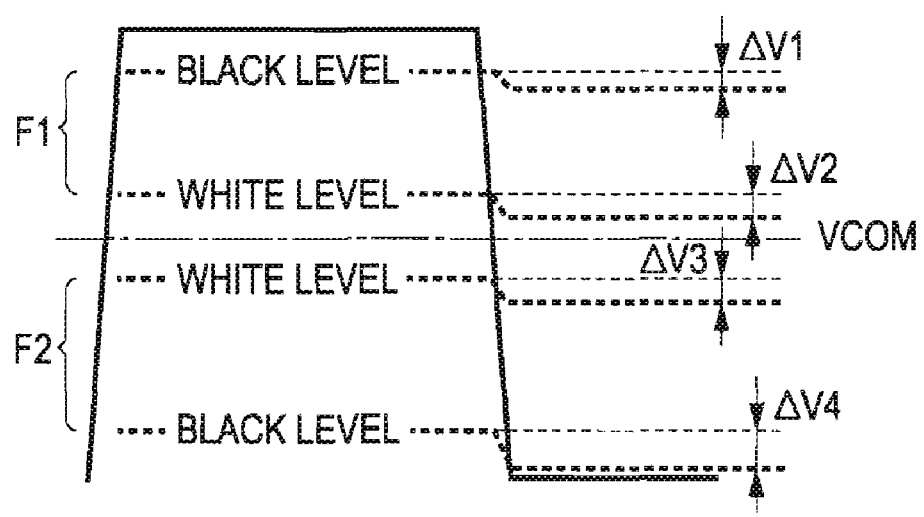
FIG. 23 is an explanation view explaining a push-down phenomenon.

The example of the electro-optical device 1 is not limited to the FFS mode liquid crystal device and may be, for example, applied to an in-plane switching (IPS) mode liquid crystal device. FIG. 21 is a schematic partial enlarged view of the IPS mode liquid crystal device, wherein FIG. 21A is a schematic plan view showing a portion of the structure of the liquid crystal device and FIG. 21B is a schematic cross-sectional view showing a portion of the liquid crystal device shown in FIG. 21A. Hereinafter, the structure of the IPS mode liquid crystal device will be described with reference to FIG. 21, concentrating on the differences from the FFS mode liquid crystal device.

In a pixel circuit P1, a scan line 20 and first and second data lines 10a and 10b are intersected with each other. A transistor 11 is formed at a position corresponding to an intersection of the scan line 20 and the first data line 10a. A transistor 12 is formed at a position corresponding to an intersection of the scan line 20 and the second data line 10b. The transistor 11 is electrically connected to a first electrode 1a. The transistor 12 is electrically connected to a second electrode 1b. Hereinafter, the structure of the transistor 11 connected to the first electrode 1a will be described with reference to FIG. 21B.

A constant potential line 35 is formed on top of the first data line 10a and a relay electrode 31 with an interlayer insulating film 32 interposed therebetween. The first electrode 1a and the second electrode 1b made of ITO and having transmissivity are formed on top of the constant potential line 35 with an interlayer insulating film 33 interposed therebetween. The first electrode 1a and the second electrode 1b are comb-like electrodes, which extend in parallel to get alternately into each other.

The first electrode 1a is electrically connected to the drain region 26 of the transistor through a contact hole 29c passing through the interlayer insulating films 32 and 33, the relay electrode 31, and a contact hole 29b. The second electrode 1b is electrically connected to the drain region of the transistor 12 (not shown) through a contact hole.

The interlayer insulating film 33 interposed between the first electrode 1a and the constant potential line 35 functions as a first hold capacitor Ca. The interlayer insulating film 33 interposed between the second electrode 1b and the constant potential line 35 functions as a second hold capacitor Cb. The first hold capacitor Ca and the second hold capacitor Cb may be configured by the constant potential line 35 and the semiconductor layers 23a and 23b, which are described in the FFS mode liquid crystal device.

The drain electrode of the transistor 11 and the drain electrode of the transistor 12 extend to a region 36 of FIG. 21A. In more detail, the drain electrode of the transistor 11 and the drain electrode of the transistor 12 are provided on different layers in the region 36 and overlap each other in a normal direction of a glass substrate 21. A third hold capacitor Cc is configured by the drain electrodes of the transistor 11 and the transistor 12 which face each other in the region 36.

In such a configuration, when a driving voltage is applied between the first electrode 1a and the second electrode 1b, an electric field according to the shapes of these electrodes occurs. In more detail, the electric field having an electric flux line from the surface of the first electrode 1a and the surface of the second electrode 1b occurs. At this time, the electric field of the upper sides of the first electrode 1a and the second electrode 1b (that is, a region in which the liquid crystal is provided) becomes a horizontal electric field having a component parallel to the glass substrate 21. The liquid crystal molecules are driven by the horizontal electric field and an alignment direction is changed in a plane parallel to the glass substrate 21. According to the IPS mode liquid crystal device, a wide viewing angle can be obtained by driving the device such that the liquid crystal molecules are always parallel to the glass substrate 21.

What is claimed is:

1. A method of driving an electro-optical element having a first electrode, a second electrode, and an electro-optical material provided between the first electrode and the second electrode and having optical characteristics which vary in accordance with an applied voltage, the method comprising:
applying a fixed voltage to the first electrode and applying a data voltage according to a gray scale level to be displayed to the second electrode in a first period;
applying the data voltage to the first electrode and applying the fixed voltage to the second electrode in a second period; and
alternately repeating the driving in the first period and the driving in the second period.

2. The method according to claim 1,
wherein gamma correction for correcting an input image signal indicating the gray scale level to be displayed according to the optical characteristics of the electro-optical material to be suitable for human visual characteristics to generate the data voltage is performed, and
wherein the data voltage of the first period and the data voltage of the second period are generated by an identical process in the gamma correction.

3. A pixel circuit comprising:
an electro-optical element including a first electrode, a second electrode, and an electro-optical material provided between the first electrode and the second electrode and having optical characteristics which vary in accordance with an applied voltage;
a first switching element which is provided between the first electrode and a first data line, to which a fixed voltage is supplied in a first period and a data voltage according to a gray scale level to be displayed is supplied in a second period, and is controlled to be turned on/off; and a second switching element which is provided between the second electrode and a second data line, to which the data voltage is supplied in the first period and the fixed voltage is supplied in the second period, and is controlled to be turned on when the first switching element is turned on and to be turned off when the first switching element is turned off.

4. The pixel circuit according to claim 3, wherein the first switching element and the second switching element are configured by identical conductive type transistors and are controlled to be turned on/off by identical control signals.

5. A pixel circuit comprising:
an electro-optical element including a first electrode, a second electrode, and an electro-optical material provided between the first electrode and the second electrode and having optical characteristics which vary in accordance with an applied voltage;
a first switching element which is provided between the first electrode and a first data line, to which a data voltage according to a gray scale level to be displayed is supplied, is turned on in a first period, and is turned off in a second period;
a second switching element which is provided between the second electrode and a second data line, to which the data voltage is supplied, is turned off in the first period, and is turned on in the second period;
a third switching element which is provided between the first electrode and a voltage line, to which a fixed voltage is supplied, is turned off in the first period, and is turned on in the second period; and
a fourth switching element, which is provided between the second electrode and the voltage line, is turned on in the first period, and is turned off in the second period.

6. The pixel circuit according to claim 5, wherein the first switching element, the second switching element, the third switching element, and the fourth switching element are configured by identical conductive type transistors.

7. An electro-optical device comprising:
a plurality of scan lines;
a plurality of data lines, each of which includes a set of a first data line and a second data line;
a plurality of pixel circuits provided in correspondence with intersections of the plurality of scan lines and the plurality of data lines; and
a data line drive unit which supplies a data voltage according to a gray scale level to be displayed to one of the set of the first data line and the second data line and supplies a fixed voltage to the other thereof, and replaces the data voltage with the fixed voltage and supplies the voltages to the first data line and the second data line in a second period, in each of the plurality of data lines,
wherein each of the plurality of pixel circuits includes:
an electro-optical element including a first electrode, a second electrode, and an electro-optical material provided between the first electrode and the second electrode and having optical characteristics which vary in accordance with an applied voltage;
a first switching element which is provided between the first electrode and the first data line, is turned on in the first period, and is turned off in the second period according to a scan signal supplied through each of the scan lines; and
a second switching element which is provided between the second electrode and the second data line, is turned on in the first period, and is turned off in the second period according to a scan signal supplied through each of the scan lines.

8. An electronic apparatus comprising the electro-optical device according to claim 7.

9. An electro-optical device comprising:
m (m is an integer of 2 or more) sets of scan lines, each set of scan lines including a first scan line and a second scan line, a first scan signal being supplied to the first scan line, and a second scan signal being supplied to the second scan line;
n+1 (n is an integer of 2 or more) data lines;
m×n pixel circuits provided in correspondence with intersections of the scan lines and the data lines;
a data line drive unit which supplies a data voltage according to a gray scale level to be displayed to odd-numbered data lines and supplies a fixed voltage to even-numbered data lines in a first period, and supplied the fixed voltage to the odd-numbered data lines and supplies the fixed voltage to the even-numbered data lines in a second period; and
a scan line drive unit which sequentially selects the m sets of scan lines and allows one of the first scan signal and the second scan signal to be valid and the other thereof to be invalid when one set of scan lines is selected, in the first period, and sequentially selects m sets of scan lines and allows the signal, which is valid in the first period, of the first scan signal and the second scan signal to be invalid and the signal, which is invalid in the first period, to be valid when one set of scan lines is selected, in the second period,
wherein each of the m×n pixel circuits includes:
a first switching element which is provided between the first electrode and a left data line and is controlled to be turned on/off according to the first scan line;
a second switching element which is provided, between the first electrode and a right data line and is controlled to be turned on/off according to the second scan line;
a third switching element which is provided between the first electrode and a voltage line to which a fixed voltage is supplied, and is controlled to be turned on/off according to the second scan line; and
a fourth switching element which is provided between the second electrode and the voltage line and is controlled to be turned on/off according to the second scan line.

* * * * *